US009938018B2

(12) United States Patent
Welsh et al.

(10) Patent No.: US 9,938,018 B2
(45) Date of Patent: *Apr. 10, 2018

(54) AIRCRAFT RECOVERY CONTROL

(71) Applicant: Aviation Safety Advancements, Inc., Philadelphia, PA (US)

(72) Inventors: David Patrick Welsh, Philadelphia, PA (US); Joseph Tobias Kujawski, Swarthmore, PA (US)

(73) Assignee: Aviation Safety Advancements, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,428

(22) Filed: Aug. 10, 2016

(65) Prior Publication Data

US 2016/0347469 A1 Dec. 1, 2016

Related U.S. Application Data

(63) Continuation of application No. 15/148,492, filed on May 6, 2016, now Pat. No. 9,440,747.

(Continued)

(51) Int. Cl.
*B64D 43/00* (2006.01)
*B64D 43/02* (2006.01)
(Continued)

(52) U.S. Cl.
CPC .......... *B64D 43/02* (2013.01); *G05D 1/0061* (2013.01); *G05D 1/0816* (2013.01)

(58) Field of Classification Search
CPC .......... B64D 43/02; B64D 2700/62263; G05D 1/0061; G05D 1/0816
See application file for complete search history.

(56) References Cited

U.S. PATENT DOCUMENTS

| 4,908,619 A | 3/1990 | Bala et al. |
| 6,694,230 B2 | 2/2004 | Kubica |

(Continued)

OTHER PUBLICATIONS

Jacobson et al. Aircraft Loss of Control Casual Factors and Mitigation Challenges: NASA, Aug. 2010.

(Continued)

*Primary Examiner* — Yuen H Wong
(74) *Attorney, Agent, or Firm* — Baker & Hostetler LLP

(57) ABSTRACT

Despite pilot training and current safety systems, aircraft accidents continue to occur. It is recognized herein that existing approaches to preventing aircraft accidents lack capabilities. A predictive aircraft recovery control unit can receive flight data from the plurality of data nodes. The flight data can be indicative of at least a speed of the aircraft and a position of the aircraft. In some cases, based on the flight data, the predictive aircraft recovery control unit can determine that the aircraft will enter a stall condition. Furthermore, based on the flight data, the predictive aircraft recovery control unit can determine a time period that will elapse before the aircraft enters the stall condition. In response to determining that the aircraft will enter the stall condition after the time period elapses, the predictive aircraft recovery control until can trigger a recovery sequence before the aircraft enters the stall condition.

17 Claims, 17 Drawing Sheets

Related U.S. Application Data

(60) Provisional application No. 62/157,913, filed on May 6, 2015.

(51) Int. Cl.
  *G05D 1/00* (2006.01)
  *G05D 1/08* (2006.01)

(56) References Cited

U.S. PATENT DOCUMENTS

| | | | |
|---|---|---|---|
| 6,735,500 | B2 | 5/2004 | Nicholas et al. |
| 7,095,338 | B2 | 8/2006 | Naimer et al. |
| 7,098,810 | B2 | 8/2006 | Bateman et al. |
| 8,195,346 | B1 | 6/2012 | Duerksen et al. |
| 8,624,757 | B2 | 1/2014 | Schrauben |
| 9,174,742 | B2 | 11/2015 | Nelson |
| 9,205,931 | B1 | 12/2015 | Kawalkar |
| 9,221,552 | B2 | 12/2015 | Conner et al. |
| 2013/0030607 | A1* | 1/2013 | Schulte ............ G05D 1/0816 701/2 |
| 2013/0211632 | A1* | 8/2013 | Caule ............... G05D 1/0061 701/3 |
| 2014/0156116 | A1* | 6/2014 | Nelson .............. B64D 43/02 701/14 |

OTHER PUBLICATIONS

Flight Safety Foundation et al., Accumulated Stress Presents Range of Health Risks; vol. 53 No. 1, Jan./Feb. 2006.
National Business Aviation Association; Reducing Loss of Control in Flight Accidents in Business Aviation; https://www.nbaa.org/ops/safety/loss-of-control-in-flight/.
Pihlajamaa, Tutorial: State Machines with C Callbacks, Code and Life, Programming, Electronics and other cool tech stuff, Oct. 2013.
Yagle et al., Linear Time-Invariant Systems and Their Frequency Response, Dept. of EECS, The University of Michigan, Fall 2005.
Discrete—Time Linear, Time Invariant Systems and z-Transforms, Joes Feldman, Apr. 2007.
The Scalar Kalman Fiter, An Introduction to Scalar Kalman Filters, http:/www.swarthmore.edu/natsci/echeeve1/ref/kalman/scalarkalman.html.

\* cited by examiner

AIRCRAFT RECOVERY CONTROL

CROSS REFERENCE TO RELATED APPLICATIONS

This application is a continuation of U.S. patent application Ser. No. 15/148,492 filed May 6, 2016 which claims the benefit of U.S. Provisional Patent Application Ser. No. 62/157,913, filed May 6, 2015, the disclosures of which are hereby incorporated by reference as if set forth in their entireties herein.

BACKGROUND

Turbine powered aircraft accidents due to loss of control, caused by an upset during flight, are a leading cause of aircraft accident fatalities in the world. An aircraft upset can be caused by, for example, a pilot's deviation from controlled flight or external elements (e.g., wind shear or wake turbulence). A major cause of aircraft upsets and subsequent loss of control in turbine powered aircrafts is an aerodynamic stall.

An aerodynamic stall occurs when the wing's critical angle of attack is exceeded. The airspeed at which an aircraft exceeds the critical angle of attack varies based on, for example, aircraft weight, load factor, and slideslip (uncoordinated flight). With respect to a given aircraft, the critical angle of attack (CoA) is the same for a given configuration. For example, leading edge slats and trailing edge flaps can change the critical angle of attack by altering the overall shape of the airfoil. Regardless of the configuration, when the CoA is exceeded, airflow disruption over the upper surface of the wing occurs, which creates a loss of lift that can result in an insufficient amount of lift to maintain flight. The CoA is a function of pitch attitude, which, in some aircrafts, the pilot can control via an elevator attached to a horizontal stabilizer. In other aircrafts, the pilot can control the pitch attitude via a combination of horizontal stabilizer and elevator movement. Using the control column, which generally includes a yoke, flight controls, and a control wheel, a pilot can control a given aircraft's pitch attitude and angle of incidence by fore and aft movements. During normal flight operations, an increase in pitch attitude requires an increase in aircraft power to retain an airspeed above that which the CoA requires. A decrease in pitch attitude, while the aircraft power remains constant, results in the acceleration of the aircraft, and thus an increase in airspeed.

When the angle of incidence (AI) of an aircraft approaches the CoA of the aircraft, the aircraft may be approaching a stall. Certain factors and conditions are often present when an aircraft approaches a stall. For example, there may be an increase in pitch attitude or an increase in control column back pressure. A stall may also be preceded by decreasing airspeed and diminished flight control effectiveness. In some cases, a turbo jet powered aircraft that has a high speed airfoil and negative pitch angle can approach a stall. An aircraft spin can occur as a result of a stall. For example, when the aircraft wing of a turbine powered multi-engine aircraft exceeds the critical angle of attack (CoA), often one wing will stop flying ahead of the other as a result of engine power and aerodynamics. Thus, when one wing stalls ahead of the other, the stalled wing can drop as the nose of the aircraft violently pitches forward or aft. Such spins can be deadly, for example, at low altitudes or when performed by turbo jet aircrafts.

To recover a given aircraft from an impending stall, typically a pilot must simultaneously decrease the pitch attitude and increase aircraft thrust. Additionally, if the aircraft is in a turn for example, the pilot should roll the aircraft so that the wings are in a level state. Thus, to recover from an impending stall, generally forward pressure is applied to the control column to reduce the pitch attitude, and thus the AI, to a margin safely below the CoA. Pilots are typically trained to recognize stalls and to recover from stalls, for instance every 6 or 12 months. Furthermore, turbine powered aircraft are generally equipped with stall warning systems and stall protection devices (e.g., stick pushers).

Despite pilot training and current safety systems, aircraft accidents continue to occur. It is recognized herein that existing approaches to preventing aircraft accidents lack capabilities.

SUMMARY

As described above, it is recognized herein that existing approaches to preventing aircraft accidents lack capabilities. For example, it is recognized herein that existing approaches lack capabilities related to mitigating human response error. In an example embodiment, a predictive aircraft recovery control unit comprises a processor, a memory, and communication circuitry. The predictive aircraft recovery control unit is configured to connect via the communication circuitry to a plurality of data nodes that obtain respective in-flight parameters associated with an aircraft. The predictive aircraft recovery control unit further comprises computer-executable instructions stored in the memory of the predictive aircraft recovery control unit which, when executed by the processor of the predictive aircraft recovery control unit, cause the predictive aircraft recovery control unit to perform various operations. For example, the predictive aircraft recovery control unit can receive flight data from the plurality of data nodes. The flight data can be indicative of at least a speed of the aircraft and a position of the aircraft. In some cases, based on the flight data, the predictive aircraft recovery control unit can determine that the aircraft will enter a stall condition. Furthermore, based on the flight data, the predictive aircraft recovery control unit can determine a time period that will elapse before the aircraft enters the stall condition. In response to determining that the aircraft will enter the stall condition after the time period elapses, the predictive aircraft recovery control until can trigger a recovery sequence before the aircraft enters the stall condition.

In another example, the predictive aircraft recovery control can determine that the aircraft will enter an unstable condition. In response to determining that the aircraft will enter the unstable condition, the predictive aircraft recovery control unit can trigger a recovery sequence before the aircraft enters the unstable condition. In particular, the predictive aircraft recovery control unit can render a visual depiction representative of a corrective action, such that, when a pilot of the aircraft complies with the corrective action, the operation of the aircraft is altered so as to avoid the unstable condition. In an example, the visual depiction of the corrective action includes a box and an aircraft reference, wherein the aircraft reference is within the box when the pilot of the aircraft complies with the corrective action.

The foregoing summarizes only a few aspects of the present disclosure and is not intended to be reflective of the full scope of the present disclosure. Additional features and advantages of the disclosure are set forth in the following description, may be apparent from the description, or may be learned by practicing the invention. Moreover, both the foregoing summary and following detailed description are exemplary and explanatory and are intended to provide further explanation of the disclosure.

BRIEF DESCRIPTION OF THE DRAWINGS

The foregoing summary, as well as the following detailed description of example embodiments of the present disclosure, will be better understood when read in conjunction with the appended drawings. For the purposes of illustrating the example embodiments of the present disclosure, references to the drawings are made. It should be understood, however, that the application is not limited to the precise arrangements and instrumentalities shown.

DETAILED DESCRIPTION OF ILLUSTRATIVE EMBODIMENTS

Figure 1:
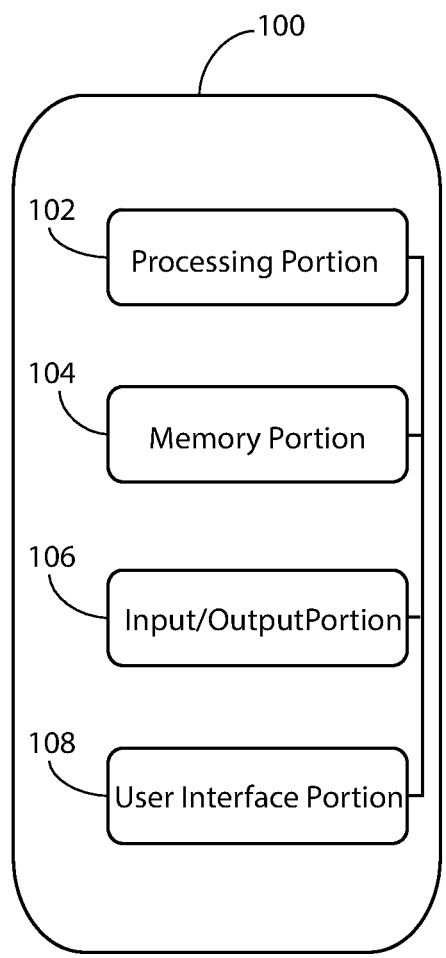
FIG. 1 is block diagram of a predictive aircraft recovery control unit in accordance with an example embodiment.

As described above, it is recognized herein that current approaches to preventing aircraft accidents lack capabilities. In particular, for example, current stall warning systems often disconnect or disengage cockpit automation upon activation of the stall warning system and stall protection devices, and thus the pilot is not provided with a solution to prevent or recover from an imminent loss of control due to an induced stall. Furthermore, it is recognized herein that current approaches, such as current stall warning systems (e.g., stick shakers) for example, do not have predictive capabilities, but instead rely on current angle of attack measurements to determine that a given aircraft is close to the critical angle of attack (CoA). It is recognized herein that these approaches can provide a pilot with little time to react. Additionally, there is presently no on board avionics equipment that assist the pilot to a recovery from an unusual attitude or upset condition caused by conditions other than a stall.

It is further recognized herein that existing approaches lack capabilities related to mitigating human response error before or during an aircraft upset condition. In particular, for example, current approaches to recovering from aircraft upset conditions do not adequately address the loss of situational awareness that can occur before or during a stall or spin. Situational awareness refers to the ability of a person (e.g., a pilot) to identify, process, and comprehend critical elements of information concerning the person's surroundings. Loss of situational awareness by a pilot threatens aircraft safety. It is recognized herein that loss of situational awareness is frequently a major contributing factor to aircraft stalls, aircraft spins, aircraft upsets, loss of control of aircrafts, and the like. When a pilot loses situational awareness, the pilot might not be aware of the warning signs to an impending loss of control flight condition.

By way of example, the National Transportation Safety Board (NTSB) stated, in a report concerning the United Express flight 3407 crash that occurred in 2009 due to a stall, that the pilots lost situational awareness and failed to recognize the decaying of airspeed that led to the stall. In this example, the pilot was alerted of a dangerous flight condition when a stall warning tone sounded and the control column began shaking violently. The aircraft required immediate and deliberate control inputs from the pilot to prevent the impending stall. Due to fatigue, according to the NTSB report, the pilot improperly reacted to the impending stall condition. As a result, the aircraft stalled approximately 1,500 feet above the ground, entered a spin with insufficient altitude to recover, and crashed nose-first into the ground, killing all 50 people on board the aircraft and 1 person on the ground. This is just one example, among others, which illustrates deficiencies in current technologies. In particular, this example and others like it demonstrate that, in some cases, pilot training and reliance on aircraft automation is not enough to prevent the loss of an aircraft due to an upset.

As the above-described example demonstrates, current approaches to aircraft upset detection and recovery fail to prevent loss of control accidents, particularly those in which human error is a factor. For example, aircraft technology has advanced to provide various stall warning systems (e.g., stick shaker devices) and enhancements to pilot situational awareness using cockpit displays, but these advancements have not eliminated loss of control accidents. One aspect that these approaches have not taken into account is the unique physiological "fight or flight" responses of each pilot under varying conditions. For example, it is recognized herein that these "fight or flight" responses can lead to pilots improperly controlling the aircraft, such as by overriding or disabling control limits and protection devices, in direct contrast to their training. Embodiments described herein take into account error that is inherent in humans during high-stress situations, while also enabling impending loss of control incidents to be predicted such that an appropriate recovery sequence is triggered before the aircraft enters an unstable condition.

Figure 2:
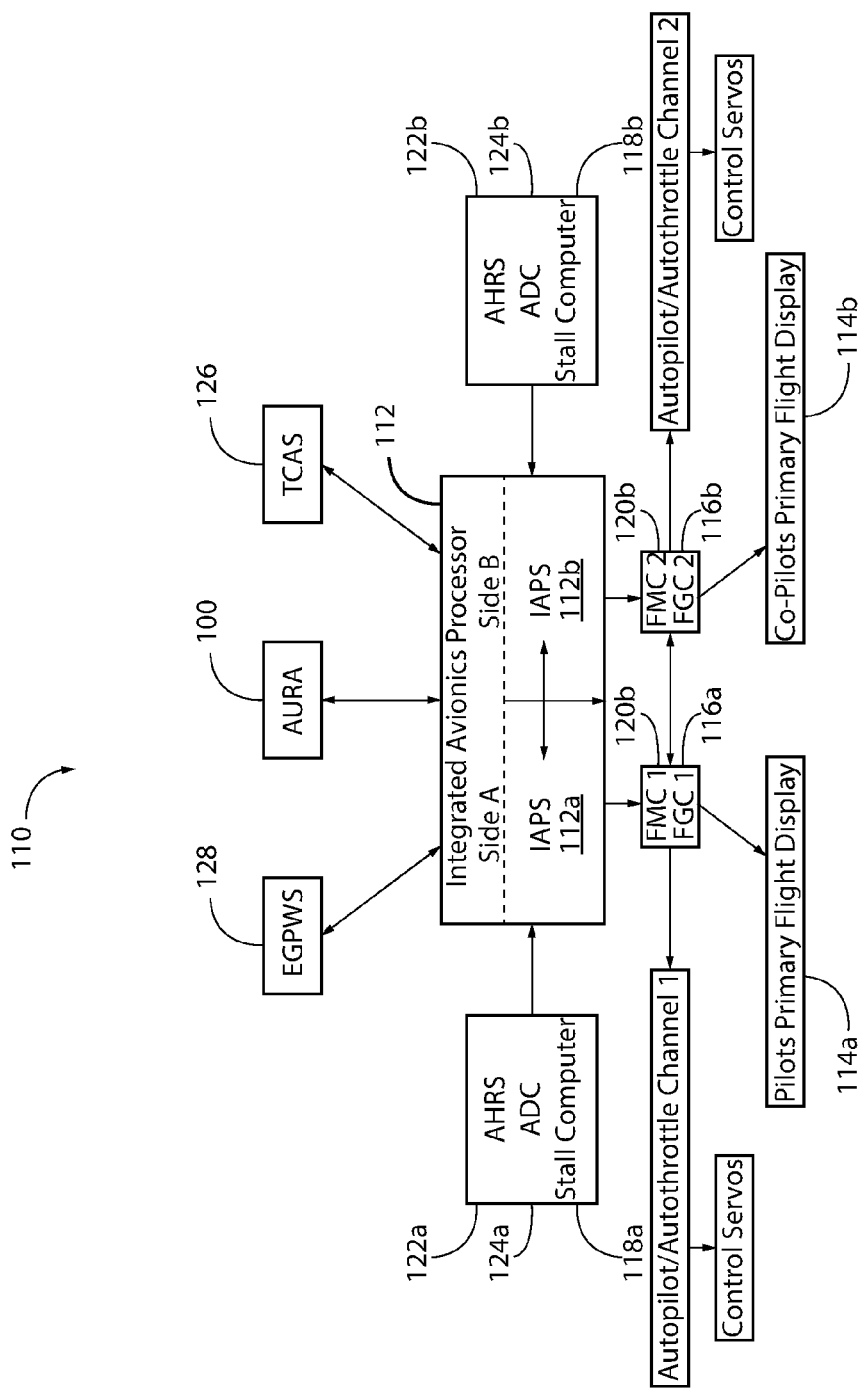
FIG. 2 is a system diagram of an avionics platform within which the predictive aircraft recovery control unit can be implemented in accordance with an example embodiment.

Referring initially to FIGS. 1 and 2, a predictive aircraft recovery control unit 100, which can also be referred to as an aircraft upset recovery augmentation (AURA) device, can prevent, for instance by triggering a recovery sequence, an aircraft from an imminent loss of control that is predicted by the aircraft recovery control unit 100. As used herein, an imminent loss of control generally refers to an aircraft flight condition that, unless corrective action is timely taken, results in a departure from controlled flight.

Referring particularly to FIG. 1, the predictive aircraft recovery control unit 100 may be configured to operate on a variety of aircrafts, for instance an FAA Part 25 or Part 23 turbine powered aircraft with a certificated gross take-off weight of 12,500 pounds or greater. It will be understood that the predictive aircraft recovery control unit 100 can include any appropriate computing device, examples of which include a line replaceable unit (LRU), a server computing device, or a portable computing device, such as a laptop, tablet or smart phone.

In an example configuration, the predictive aircraft recovery control unit 100 includes a processing portion 102, a memory portion 104, an input/output portion 106, and a user interface (UI) portion 108. It is emphasized that the block diagram depiction of the predictive aircraft recovery control unit 100 is exemplary and not intended to imply a specific implementation and/or configuration. The processing portion 102, memory portion 104, input/output portion 106, and user interface portion 108 can be coupled together to allow communications there between. As should be appreciated, any of the above components can be distributed across one or more separate devices and/or locations. In an example, the processing portion 102 can include an ISO 9001:2008 Avionics Specification Printed Circuit Board, a 64-bit Superscaler 750 MHz MIPS microprocessor, and an Industry Standard MCS-96 Microcontroller.

In various embodiments, the input/output portion 106 includes a receiver of the predictive aircraft recovery control unit 100, a transmitter of the predictive aircraft recovery control unit 100, or a combination thereof. The input/output portion 106 is capable of receiving and/or providing information pertaining to flight conditions of a given aircraft. The input/output portion 106 can communicate in a network such as, for example, an avionics platform 110 shown in FIG. 2. As should be appreciated, transmit and receive functionality may also be provided by one or more devices external to the predictive aircraft recovery control unit 100. In some cases, the input/output portion 106 can include an ARINC 429 bus, such that the predictive aircraft recovery control unit 100 can communicate output data and commands, via the ARINC 429 bus, through a central or integrated avionics processing unit 112 to various components of the avionics platform 110, such as a first primary flight display 114*a*, an aircraft aural warning system, or one or more flight guidance computers, for instance a first flight guidance computer (FGC) 116*a* and a second flight guidance computer 116*b*. The predictive aircraft recovery control unit 100 can also communicate with one or more flight management computers, for instance a first flight management computer (FMC) 120*a* and a second flight management computer 120*b*. It will be understood that the flight guidance computers may be integrated with the flight management computers, or the flight guidance computers may be separate from the flight management computer. In an example, the predictive aircraft recovery control unit 100 is integrated within the avionics platform 110 via the ARINC standard data protocol, though it will be understood that the predictive aircraft recovery control unit 100 can communicate using alternative protocols as desired. Furthermore, the input/output portion 106 can include appropriate aircraft avionics connection plugs for multiple aircrafts and platforms.

Referring to FIG. 2, it will be understood that FIG. 2 depicts one example of a suitable architecture in which the predictive aircraft recovery control unit 100 can be implemented, it being appreciated that numerous suitable alternative architectures are envisioned. That is, the avionics platform 110 is presented for purposes of example, and the predictive aircraft recovery control unit 100 can operate within alternative avionics platforms as desired. Furthermore, it will be understood that the avionics platform 110 can be included in a variety of different types of aircraft. In accordance with the illustrated example, the avionics platform 110 can include the predictive aircraft recovery control unit 100, the central avionics processing unit 112, one or more primary flight displays (e.g., a first primary flight display 114*a* and a second primary flight display 114*b*), an aircraft aural warning system, one or more flight guidance computers, and one or more flight management computers. As shown, the central avionics processing unit 112 can include a first integrated avionics processor system (IAPS) 112*a* and a second integrated avionics processor system (IAPS) 112*b*. In some cases, the first IAPS 112*a* can communicate with components that are used by the pilot (e.g., the first flight guidance computer 116*a* and the first primary flight display 114*a*), and the second IAPS 112*b* can communicate with components that are used by the co-pilot (e.g., the second flight guidance computer 116*b* and the second primary flight display 114*b*), though it will be understood that the central avionics processor 112 can be alternatively configured as desired.

The avionics platform 110 can further include a plurality of data nodes that are communicatively coupled to the predictive aircraft recovery control unit 100. The plurality of data nodes can include, for example and without limitation, one or more stall computers (e.g., a first stall computer 118*a* and second stall computer 118*b*), one or more attitude and heading reference systems (e.g., a first attitude and heading reference system (AHRS) 122*a* and a second AHRS 122*b*), one or more air data computers (e.g., a first air data computer (ADC) 124*a* and a second ADC 124*b*), one or more angle of attack instruments, one or more radar altimeters for measuring the aircraft's altitude above ground level (AGL), one or more flap position sensors for measuring the position of respective flaps, one or more landing gear position sensors for measuring whether associated landing gear is engaged, and one or more thrust level angle position sensors for measuring an angle of the thrust lever. In an example, the aircraft's critical angle of attack (CoA) at a given (e.g., current) configuration can be obtained by the aircraft recovery control unit 100 from the stall computers 118*a* and 118*b*. Using the pilot's static instrumentation, for example, the air data computers can determine various flight data such as airspeed, altitude (e.g., distance above sea level), vertical rate of speed, and the like. Each of the first and second attitude and heading reference systems 122*a* and 122*b* can include various sensors that measure attitude information associated with the aircraft. The attitude and heading reference systems 122a and 122b can measure the pitch angle referenced to an artificial horizon or a roll angle referenced to an artificial horizon. For example, the attitude and heading reference system 122a can include sensors on three axes, such that roll, pitch, and yaw are measured. The data nodes can be communicatively coupled to the predictive aircraft recovery control unit 100. The plurality of data nodes can obtain respective in-flight parameters associated with an aircraft. Thus, the predictive aircraft recovery control until 100 can receive respective in-flight parameters from the plurality of data nodes. For example, the predictive aircraft recovery control unit 100 can receive flight data from the plurality of data nodes, and the flight data can be indicative of at least a speed of the aircraft and a position of the aircraft.

The plurality of data nodes can include an angle of attack (AoA) instrument and the stall computers 118a and 118b. The AoA instrument can be mounted on the fuselage of the aircraft. The AoA instrument can measure an instantaneous angle of attack and stream this data to at least one of the stall computers 118a and 118b. The stall computers can provide a control column "shaker" warning when the AoA is within a predetermined threshold as compared to the CoA, and can provide a control column "pusher" when the AoA meets or exceeds the CoA. In an example, the AoA instrument can also send, for instance periodically or continuously, its measured AoA data to the predictive aircraft recovery control unit 100. Alternatively, or additionally, the predictive aircraft recovery control unit 100 can obtain the angle of attack data via the one or more stall computers 118a and 118b.

Referring again to FIG. 1, depending upon the exact configuration and type of processor, the memory portion 104 can be volatile (such as some types of RAM), non-volatile (such as ROM, flash memory, etc.), or a combination thereof. In an example, the memory portion 104 can include a 64M SSRAM memory. The avionics platform 110 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the predictive aircraft recovery control unit 100.

The predictive aircraft recovery control unit 100 also can contain the user interface portion 108 allowing a user to communicate with the predictive aircraft recovery control unit 100. The user interface 108 can include inputs that provide the ability to control the predictive aircraft recovery control unit 100, via, for example, buttons, soft keys, a mouse, voice actuated controls, a touch screen, or the like. By way of example, a user can use the user interface 108 to configure the predictive aircraft recovery control unit 100 for the aircraft (e.g., model of aircraft) in which the predictive aircraft recovery control unit will operate. Thus, the predictive aircraft recovery control unit 100 can be configured with various flight parameter tolerances, for instance a critical angle of attack corresponding to various wing configurations, associated with the aircraft. The user interface portion 108 can provide outputs, including visual information (e.g., via a display), audio information (e.g., via speaker), mechanically (e.g., via a vibrating mechanism), or a combination thereof. In various configurations, the user interface portion 108 can include a display, a touch screen, a keyboard, or any combination thereof. The user interface portion 108 can further include any suitable device for inputting biometric information, such as, for example, fingerprint information, retinal information, voice information, and/or facial characteristic information. Thus, the predictive aircraft recovery control unit 100 can include a processor, a memory, and communication circuitry. The predictive aircraft recovery control unit 100 can be configured to connect via the communication circuitry to a plurality of data nodes that obtain respective in-flight parameters associated with an aircraft. The predictive aircraft recovery control unit 100 can further include computer-executable instructions stored in the memory of the predictive aircraft recovery control unit 100 which, when executed by the processor of the predictive aircraft recovery control unit 100, cause the predictive aircraft recovery control unit to perform operations, such as the operations described below.

The predictive aircraft recovery control unit 100 can be configured to interoperate with various electronic flight information systems, avionics components, and flight deck applications. For example, the predictive aircraft control until 100 can be integrated with a traffic collision avoidance system (TCAS) 126 or an enhanced ground proximity warning system (EGPWS) 128. In some cases, the predictive aircraft recovery control unit 100 is configured as a Line Replaceable Unit (LRU) that can be installed in an aircraft's Integrated Card Cage, Central Avionics Processing Unit, Integrated Avionics Processor System, or any alternative central avionics power distribution and integration center. In some cases, for example, the predictive aircraft recovery control unit 100 can be installed in a central avionics integration and distribution center, such that the aircraft recovery control unit 100 receives electrical power and full data integration through the ARINC 429 bus with other avionics components. Electrical protection can be provided through a standard aircraft circuit breaker that is appropriate to the power demands of the predictive aircraft recovery control unit 100. Thus, the predictive aircraft recovery control unit 100 can seamlessly transition between flight deck platforms and can function in a universal manner, such that the operation of the predictive aircraft recovery control unit 100 with aircraft systems and pilots is standardized from one aircraft to the next.

Figure 3:
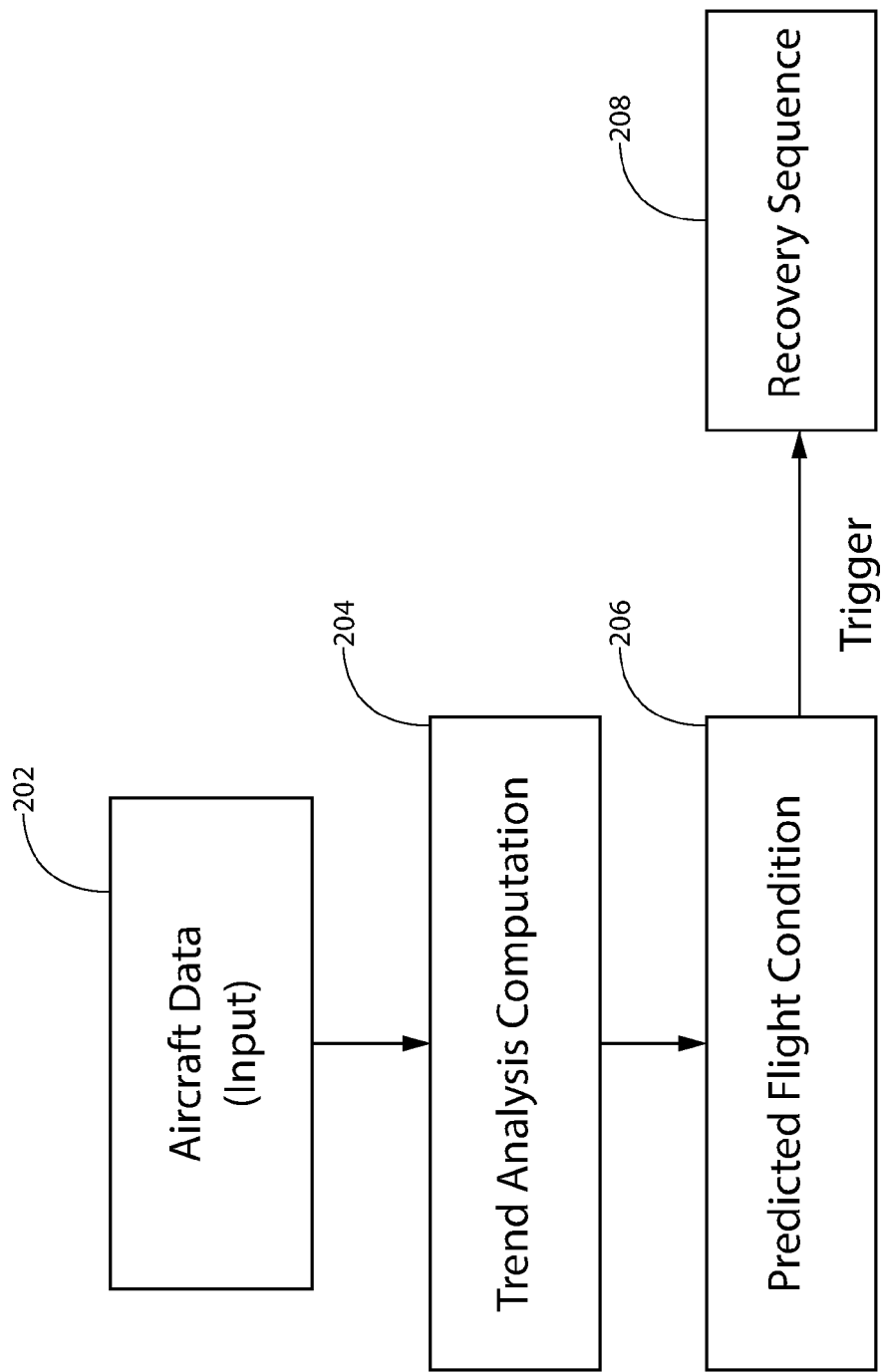
FIG. 3 depicts a method that can be performed by the predictive aircraft recovery control unit in accordance with an example embodiment.

Referring now to FIG. 3, the steps depicted in FIG. 3 can be performed by the predictive aircraft recovery control unit 100, which can communicate with one or more components or nodes via an architecture such as the avionics platform 110 depicted in FIG. 2. At 202, in accordance with the illustrated example, the predictive aircraft recovery control unit 100 receives aircraft or flight data, for example, from a plurality of data nodes that obtain respective-in flight parameters associated with an aircraft. The flight data can be received periodically, continuously, in response to an event, or at alternative times as desired. In an example, the flight data is indicative of at least the speed of the aircraft and a position of the aircraft. For example, the flight data can include the in-flight parameters that are indicative of at least one of an altitude of the aircraft, an airspeed of the aircraft, a vertical speed of the aircraft, an angle of attack of the aircraft, a thrust lever angle of the aircraft, an engine speed of the aircraft, a bank angle of the aircraft, a critical angle of attack of the aircraft, a flap position of the aircraft, and a landing gear position of the aircraft. In particular, for example, the aircraft recovery control unit 100 can receive, for instance periodically or continuously, an airspeed, altitude, or vertical speed (e.g., as a measure of feet per second) from the one or more air data computers 124a and 124b. The aircraft recovery control unit 100 can receive, for instance periodically or continuously, the pitch angle and roll angle from the one or more attitude heading and reference systems 122a and 122b. The aircraft recovery control unit 100 can receive, for instance periodically or continuously, the angle of attack associated with the aircraft from the one or more angle of attack instruments. The aircraft recovery control unit 100 can receive additional angle of attach data, such as the CoA of attack associated with the aircraft at its current configuration, from the one or more stall computers 118a and 118b. The aircraft recovery control unit 100 can receive, for instance periodically or continuously, altitude data (e.g., distance above sea level) from the radar altimeter. Further, the aircraft recovery control unit 100 can receive, for instance periodically or continuously, flap position data from the one or more flap position sensors, landing gear position data from the one or more landing gear sensors, and thrust lever angle data from the one or more thrust lever angle position sensors. The aircraft recovery control unit 100 can process one or more of the above-described parameters to predict flight conditions, for instance an unstable condition, associated with the aircraft in which the aircraft recovery unit 100 is deployed.

Still referring to FIG. 3, at 204, in accordance with the illustrated example, the predictive aircraft recovery control unit 100, based on the received flight data, performs one or more trend analysis computations. In an example, the predictive aircraft recovery control unit 100 can compute a trend based on the flight data that is received over time. The trend can predict select in-flight parameters after the time period elapses. Further, the trend can be compared to predetermined in-flight parameters that are accessed by, for instance stored in, the predictive aircraft recovery control unit 100. Each predetermined in-flight parameter can be representative of a respective tolerance. Thus, based on the comparison, the predictive aircraft recovery control unit 100 can determine whether at least one of the in-flight parameters will be outside the tolerance when the time period elapses.

For example, using the angle of attack data that is received from the one or more angle of attack instruments, the predictive aircraft recovery control unit can compute a rate in which the angle of attack is increasing. Based on the rate of increase, the predictive aircraft recovery control unit 100 can determine the angle of attack when a certain time period elapses. The predictive aircraft recovery control unit 100 can compare this determined angle of attack to the CoA that can be received from the stall computers 118a and 118b. If the determined (predicted) angle of attack less greater than the critical angle of attack, the predictive aircraft control unit determines that the aircraft will enter a stall condition, and further determines a time period that will elapse before the aircraft enters the stall condition.

In an example embodiment, the predictive aircraft recovery control unit 100 can apply one or more predictive models to the flight data to predict an aircraft's flight condition. For example, the predictive aircraft recovery control unit 100 can apply a Linear Time Invariant (LTI) model to at least one, for instance each, of the in-flight parameters mentioned above. The predictive aircraft recovery control unit 100 can also apply non-linear solutions (e.g., Fuzzy logic, neural networks, and machine learning techniques) to generate predictions of the future state of the aircraft, though it is recognized herein that classic LTI systems have the advantage of being amenable to proofs of stability (or conditional stability) and are generally robust with respect to noisy inputs. Discrete LTI (DLTI) systems are treated in a similar fashion to classic LTI systems except that the analysis will typically take place in Z-Transform space (instead of the Laplace Transform place of the LTI system). Proofs for system stability are more difficult for DLTI systems, but these types of systems align with modern digital controls due to the discretized nature of acquiring control inputs in any computer system.

Figure 4:
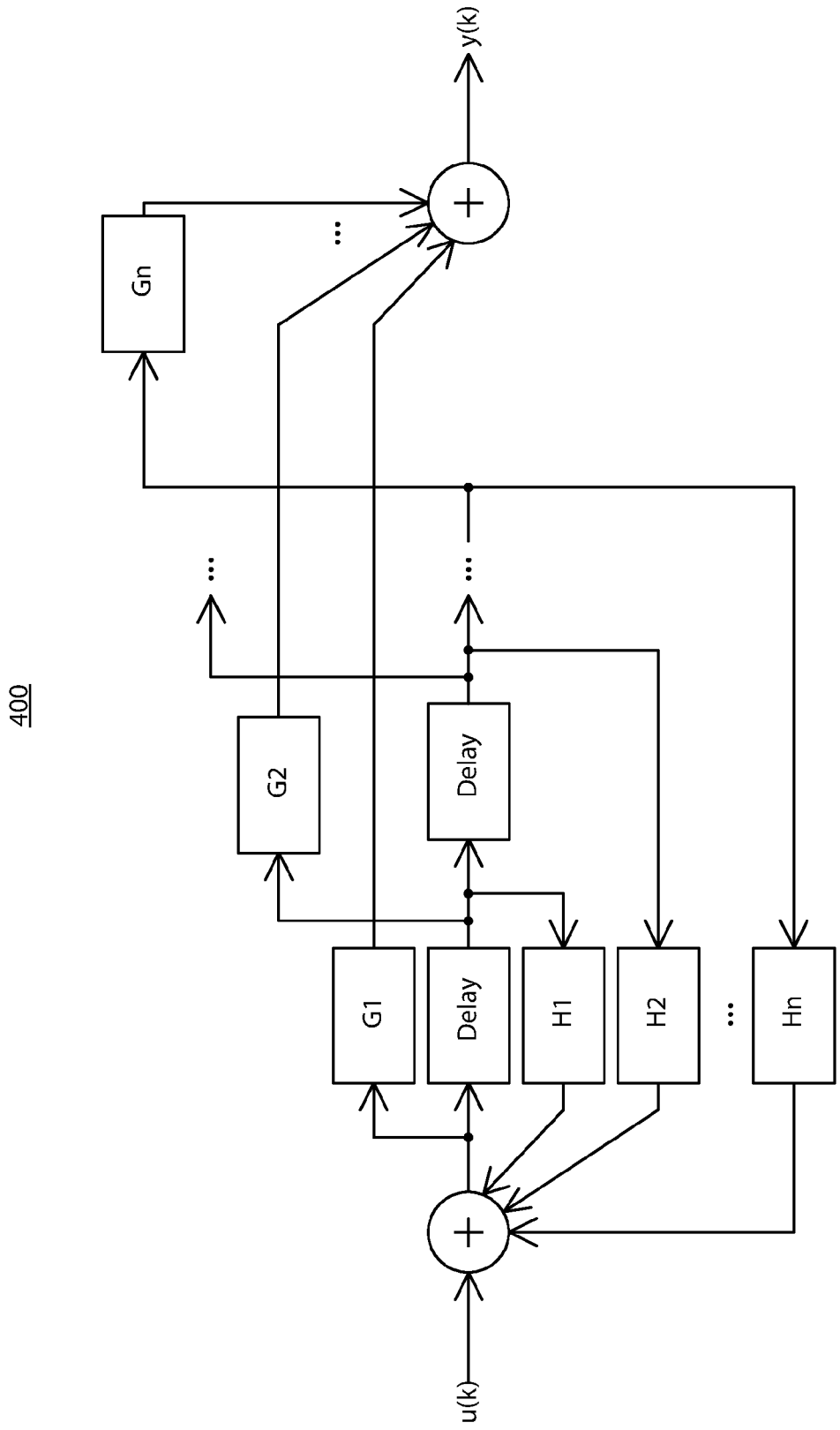
FIG. 4 is a diagram of an example model that can be implemented by the predictive aircraft recovery control unit to predict one or more in-flight parameters associated with a given aircraft.
Figure 5:
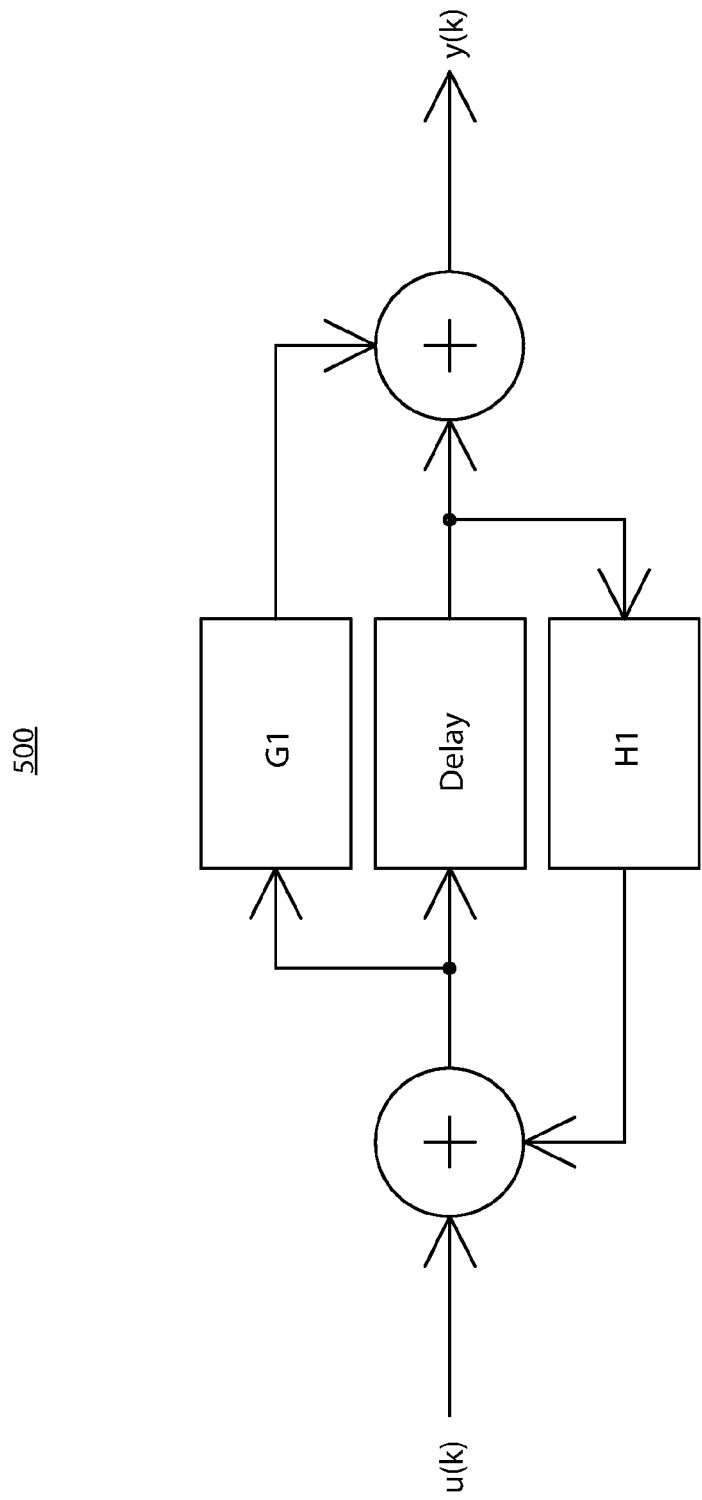
FIG. 5 is a diagram of an example feedback filter that can be implemented by the predictive aircraft recovery control unit to predict one or more in-flight parameters associated with a given aircraft.
Figure 6:
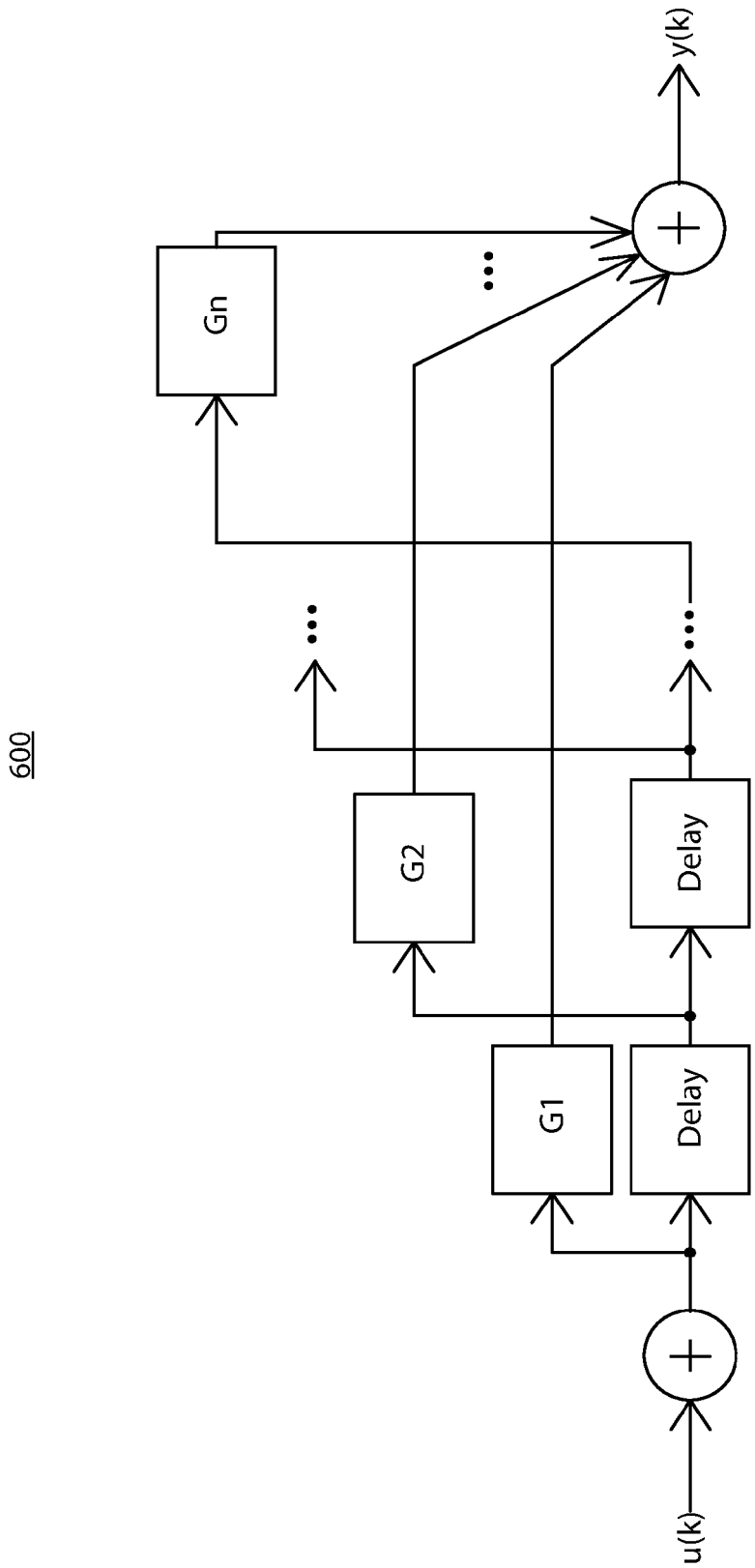
FIG. 6 is a diagram of an example feed forward filter that can be implemented by the predictive aircraft recovery control unit to predict one or more in-flight parameters associated with a given aircraft.

Referring now to FIG. 4, in some cases, when an in-flight parameter is well characterized for example, the predictive aircraft recovery control unit 100 can use a model 400 for trend analysis. Referring to FIG. 5, the predictive aircraft recovery control unit 100 can use a model 500 to represent basic data trends. For example, if an algorithm is as simple as y(k+1)=½*(u(k)+y(k)), which averages the current input with the previously calculated value, the model can look like the model 500 depicted in FIG. 5, where G1 and H1 would both be equal to ½. FIG. 6 illustrates another example model 600 that the predictive aircraft recovery control unit 100 can use to obtain trend data. Here, previous readings are averaged, and the topography for this type of system can be represented as shown in FIG. 6. For example, when G1 through Gn all have the same value (e.g., 1/n), the output is an average of these inputs and the system can be implemented as an equation y(k)=1/n*(u(k)+u(k−1)+u(k−2) . . . u(k−(n−1))).

Multiple inputs (e.g., in-flight parameters) can be modelled individually, or collectively, using related techniques. In general, FIGS. 4-6 can be expressed as a system of linear equations:

$$\dot{x} = Ax + Bu \qquad \text{Equation 1}$$

$$y = Cx + Du \qquad \text{Equation 2}$$

Figure 7:
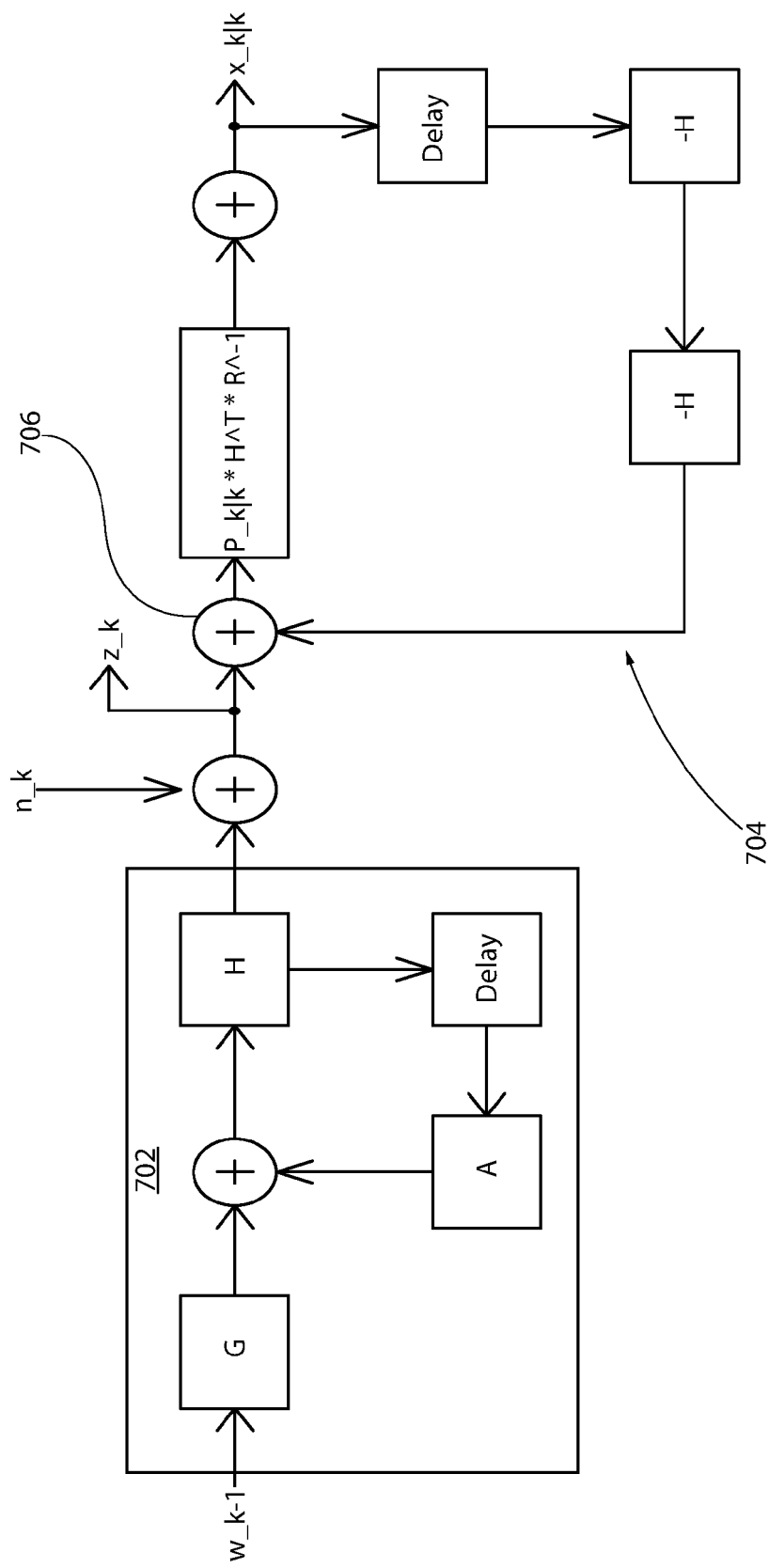
FIG. 7 is a diagram of another example model that can be implemented by the predictive aircraft recovery control unit to predict one or more in-flight parameters associated with a given aircraft.

In another example, referring to FIG. 7, in-flight parameters and trends in the flight data can be estimated by using a class of linear quadratic estimators known generally as Kalman filters. Kalman filters use state variables to develop a model for the system which is particularly good at rejecting noise and estimating the state parameters. The general equations for Kalman Filters are shown below.

$$\hat{x}_{k|k} = A\hat{x}_{k|k-1} + Bu_{k-1} + K_k[z_k - H_k A\hat{x}_{k-1|k-1}] \qquad \text{Equation 3}$$

$$K_k = P_{k|k-1} H^T (HP_{k|k-1} H^T + R)^{-1} \qquad \text{Equation 4}$$

$$P_{k|k} = [I - K_k H] P_{k|k-1} \qquad \text{Equation 5}$$

$$\hat{x}_{k|k-1} = A\hat{x}_{k-1|k-1} \qquad \text{Equation 6}$$

$$P_{k|k-1} = AP_{k-1|k-1} A^T + GQG^T \qquad \text{Equation 7}$$

FIG. 7 depicts these equations in graphical form, which includes a system estimator 702, an error feedback 704 at the summing node 706 near z_k, and an extrapolation system 708. In some cases, if the simpler data trend system is insufficient to control noise and provide a proper predictive model of the aircraft state, for example, then the predictive aircraft recovery control unit 100 can apply a more sophisticated Kalman filter model of the system with the appropriate coefficients.

Using the above-described techniques, in-flight parameters can be predicted at a future time, by the predictive aircraft recovery control unit 100. By way of example, referring generally to FIGS. 8A-E, a future angle of attack can be determined, by the predictive aircraft recovery control unit 100, based on flight data. In general, estimators, such as those implemented by the predictive aircraft recovery control unit 100, determine the unknown coefficients in the feedback equations discussed above by feeding back the difference between the solution computed by the estimator and the actual value. Based on the feedback, estimates of the coefficients can be revised. Estimators are a key part of the first half of the Kalman filter and can be more amenable to being explained in terms of linear algebra than the diagrams described above.

Given a series of observations in the time domain for a particular parameter, the predictive aircraft recovery control unit 100 can implement an estimator that computes the current system (in-flight) parameters. With respect to the examples depicted in FIGS. 8A-E, the angle of attack is predicted, but it will be appreciated that any alternative flight parameter can be alternatively, or additionally, predicted as desired. The estimator can compute the parameters in the following fashion:

Given the column vector $Y_{Hist} = [y_{t-1}; y_{t-2}; \ldots; y_{t-n}]$ where n is the length of the parameter history being considered, the estimate for the state variables in the system can be:

$$\hat{A}_t = \hat{A}_{t-1} + G_t(y_t - Y_{Hist}^T * \hat{A}_{t-1})$$

Where $$G_t = \frac{(P_{t-1} * Y_{Hist}^T)}{1 + Y_{Hist}^T * P_{t-1} * Y_{Hist}}$$

And $$P_t = P_{t-1} - \frac{(P_{t-1} * Y_{Hist} * Y_{Hist}^T P_{t-1})}{1 + Y_{Hist}^T * P_{t-1} * Y_{Hist}}$$

Applying this process at, for example, time t=1, 2, 3, etc. can produce an estimate for the state variable $\hat{A}$ at any given time t. In an example, once the system state parameters are estimated, the state of the system during the next time interval can be computed as:

$$y_{t+1} = Y_{Hist}^T * \hat{A}_t$$

where $Y_{Hist}$ can then be updated with the new predicted value of $y_{t+1}$. Thus, the equation above can be applied iteratively to produce expected values for $y_{t+2}$, $y_{t+3}$, ... $y_{t=desired\ time}$. For example, the predictive aircraft recovery control unit 100 can implement the above-described techniques to predict an angle of attach at various times in the future (e.g., 5, 10, 30 seconds), as shown in FIGS. 8A-E.

Referring to FIGS. 8A-E, example implementations of the algorithm described above are shown. Each of the illustrated examples shows how the predictive aircraft recovery control unit can track the angle of attack and predict the future state of the angle of attack. It will be understood that although the angle of attack is illustrated, alternative flight parameters, whether considered individually or in combination with each other, can also be tracked and predicted as shown. In accordance with the illustrated example, plot line 802 represents the angle of attack at the current time, plot line 804 represents the angle of attack at 5 seconds after the current time, plot line 806 represents the angle of attack at 10 seconds after the current time, and plot line 808 represents the angle of attack at 30 seconds after the current time. In accordance with the illustrated example, a plot line 810 represents the critical angle of attack, which is 12. It will be understood that the illustrated critical angle of attack is presented for purposes of example, and the critical angle of attack can vary based on the aircraft and the aircraft's configuration.

Figure 8A:
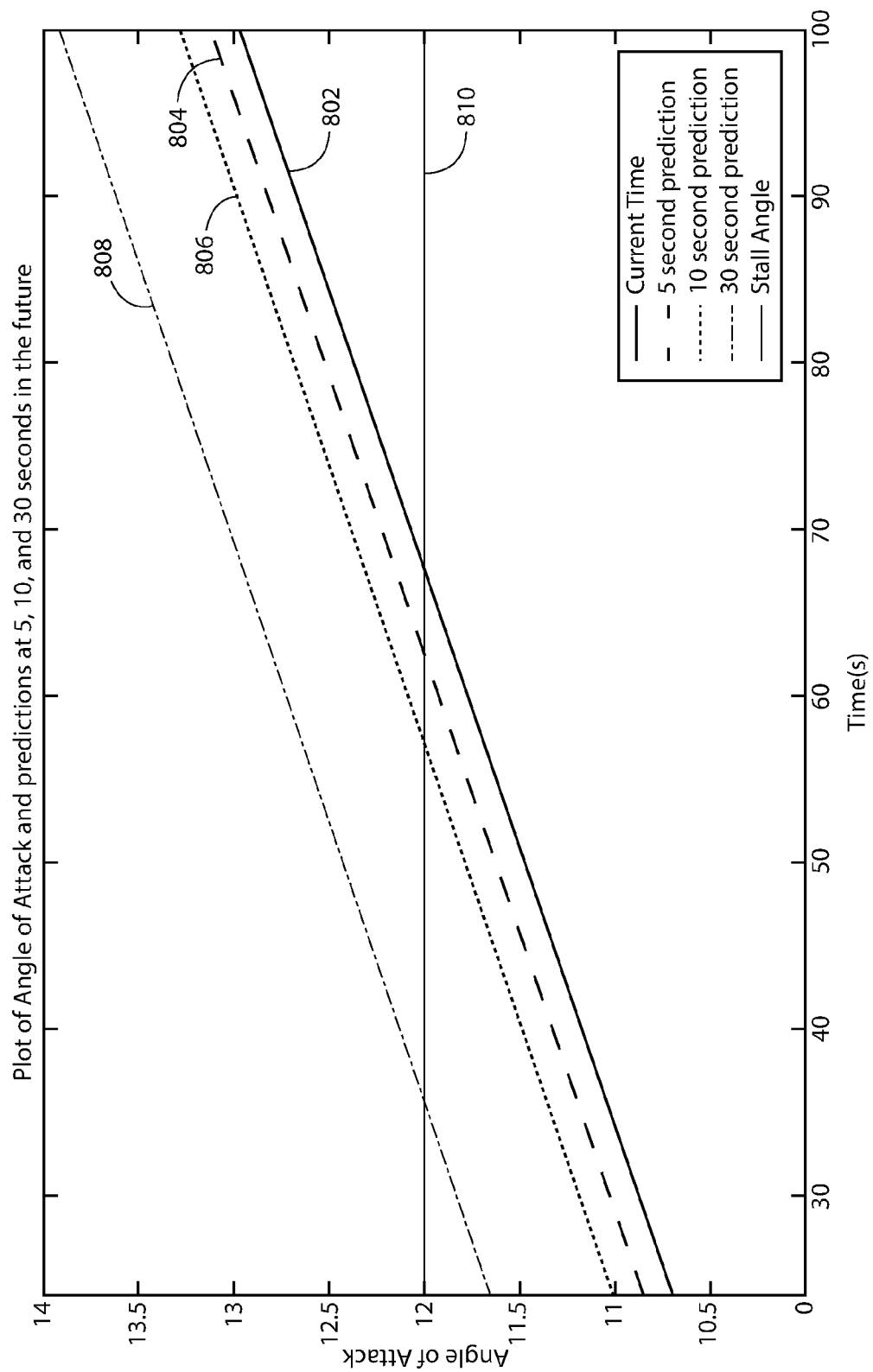
FIG. 8A is a graph that illustrates an example estimation, which can be determined by the predictive aircraft recovery control unit, of an example angle of attack parameter.
Figure 8B:
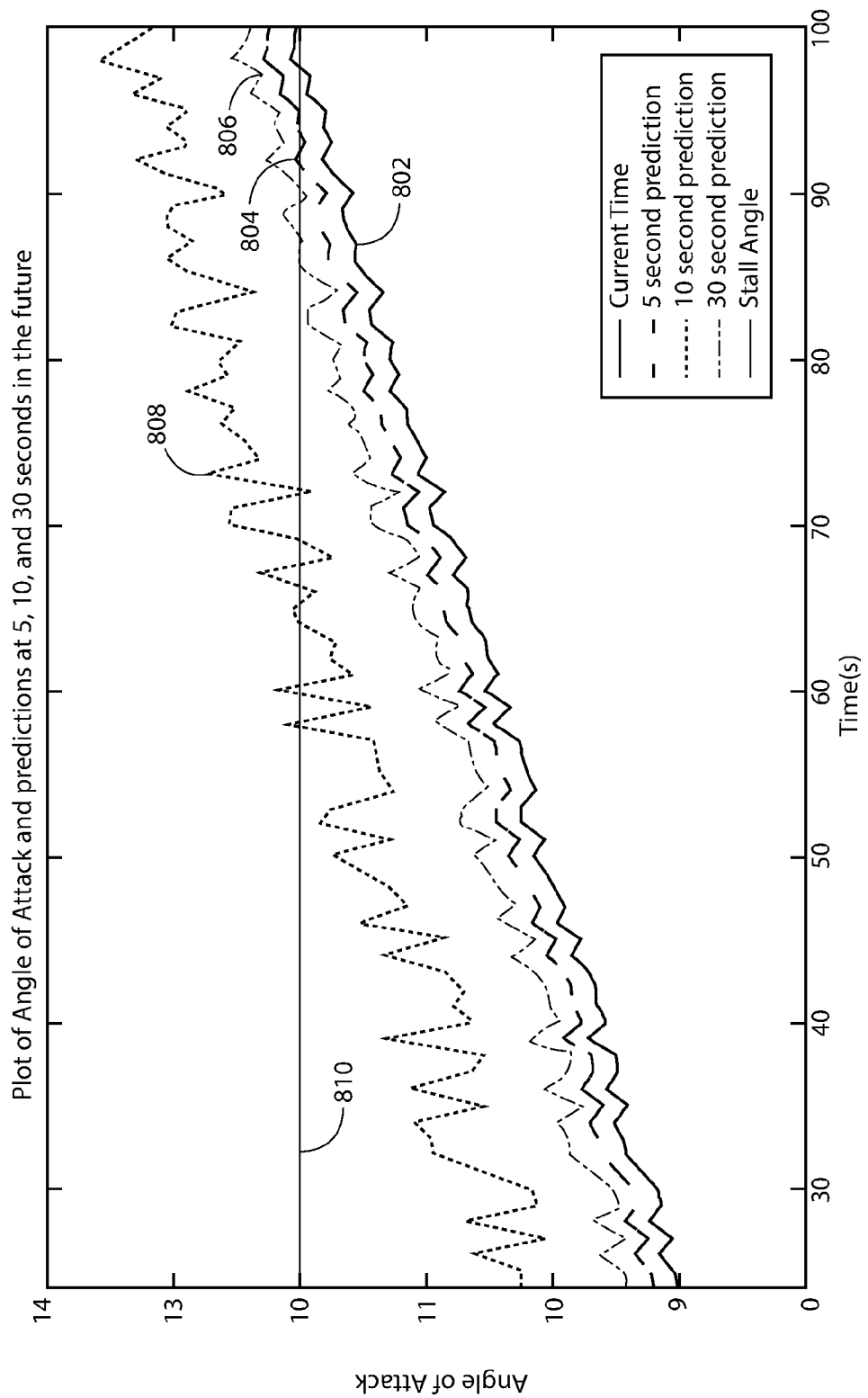
FIG. 8B is a graph that illustrates another example estimation, which can be determined by the predictive aircraft recovery control unit, of an example angle of attack parameter.
Figure 8C:
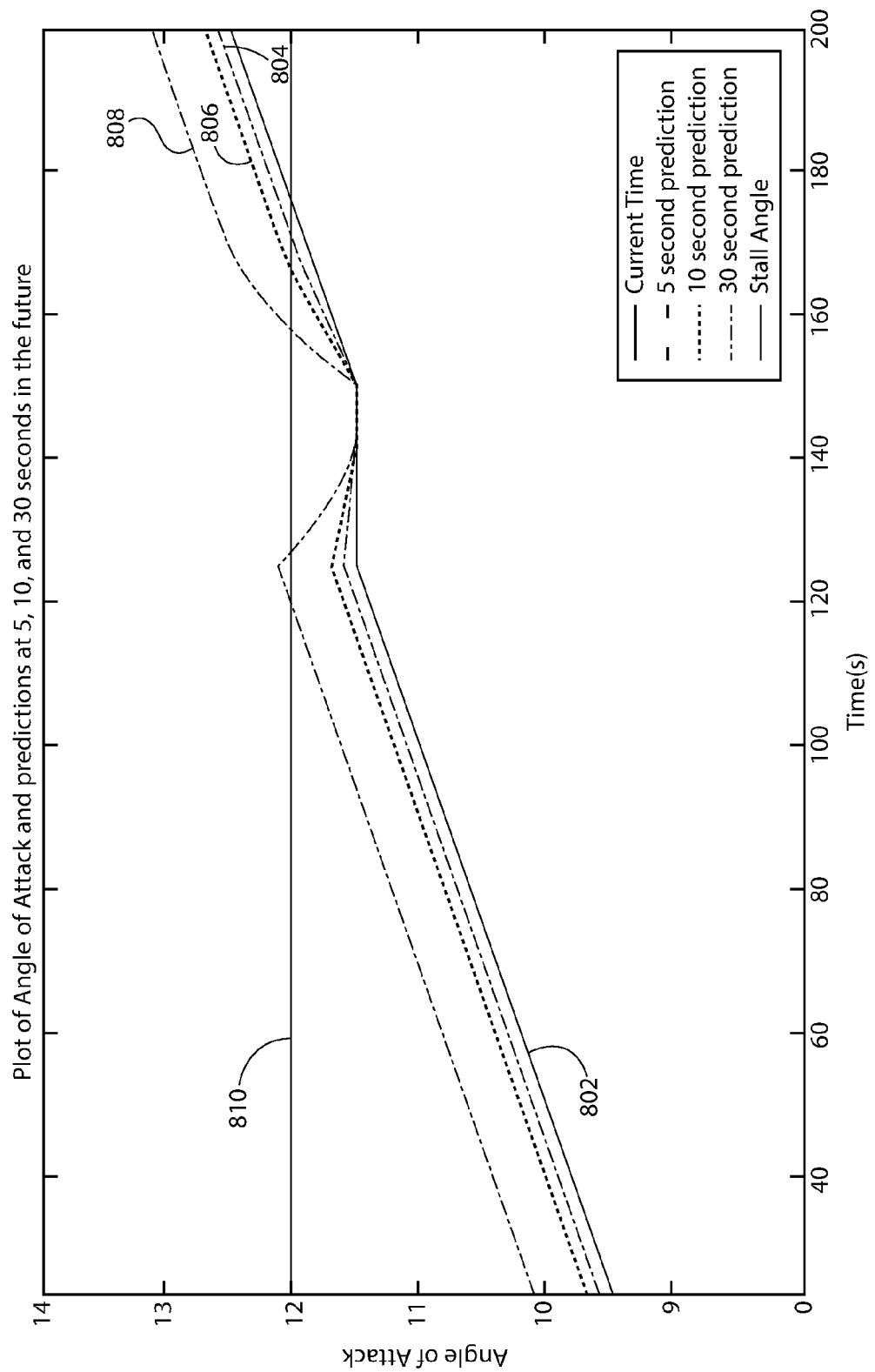
FIG. 8C is a graph that illustrates another example estimation, which can be determined by the predictive aircraft recovery control unit, of an example angle of attack parameter.
Figure 8D:
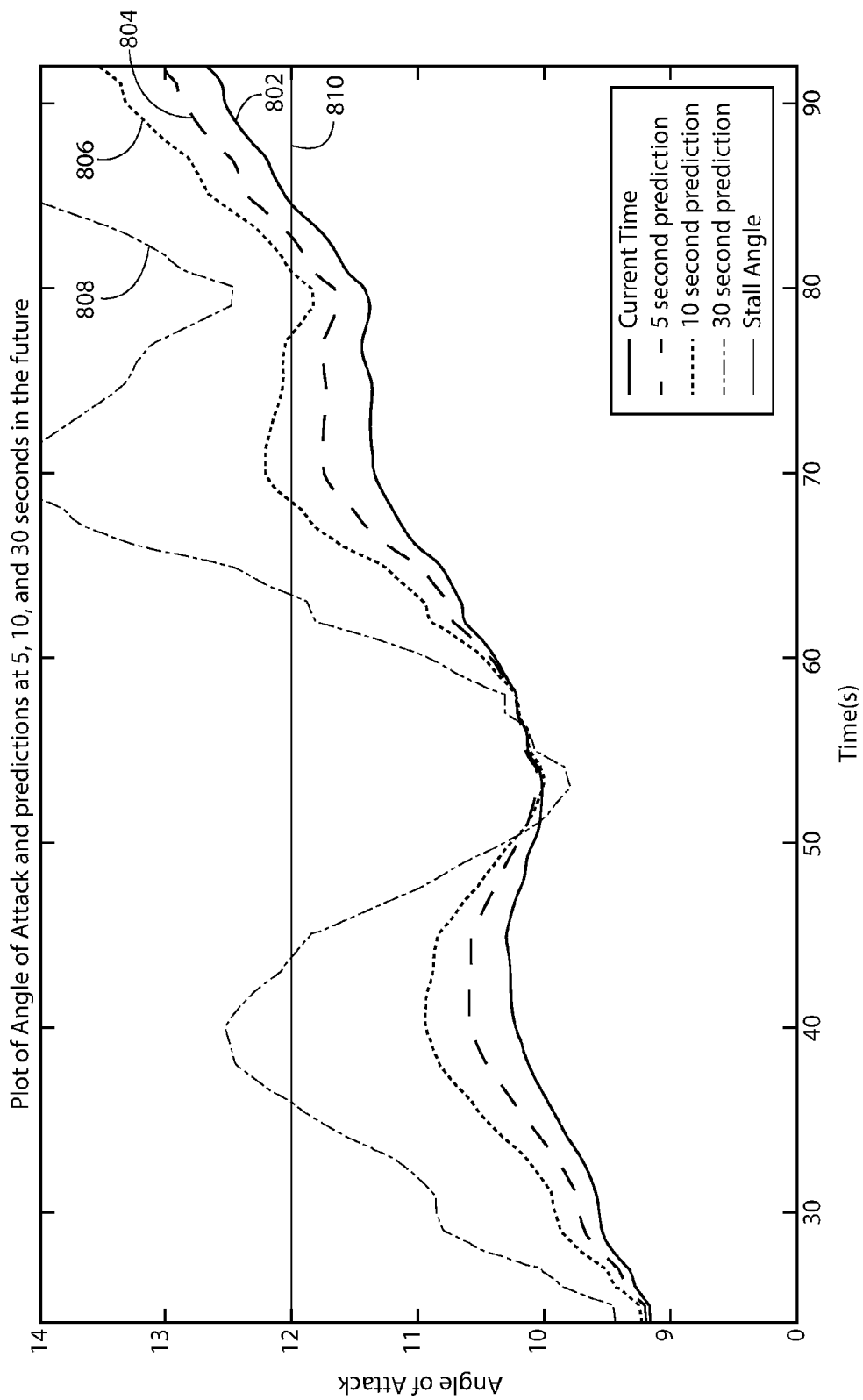
FIG. 8D is a graph that illustrates another example estimation, which can be determined by the predictive aircraft recovery control unit, of an example angle of attack parameter.
Figure 8E:
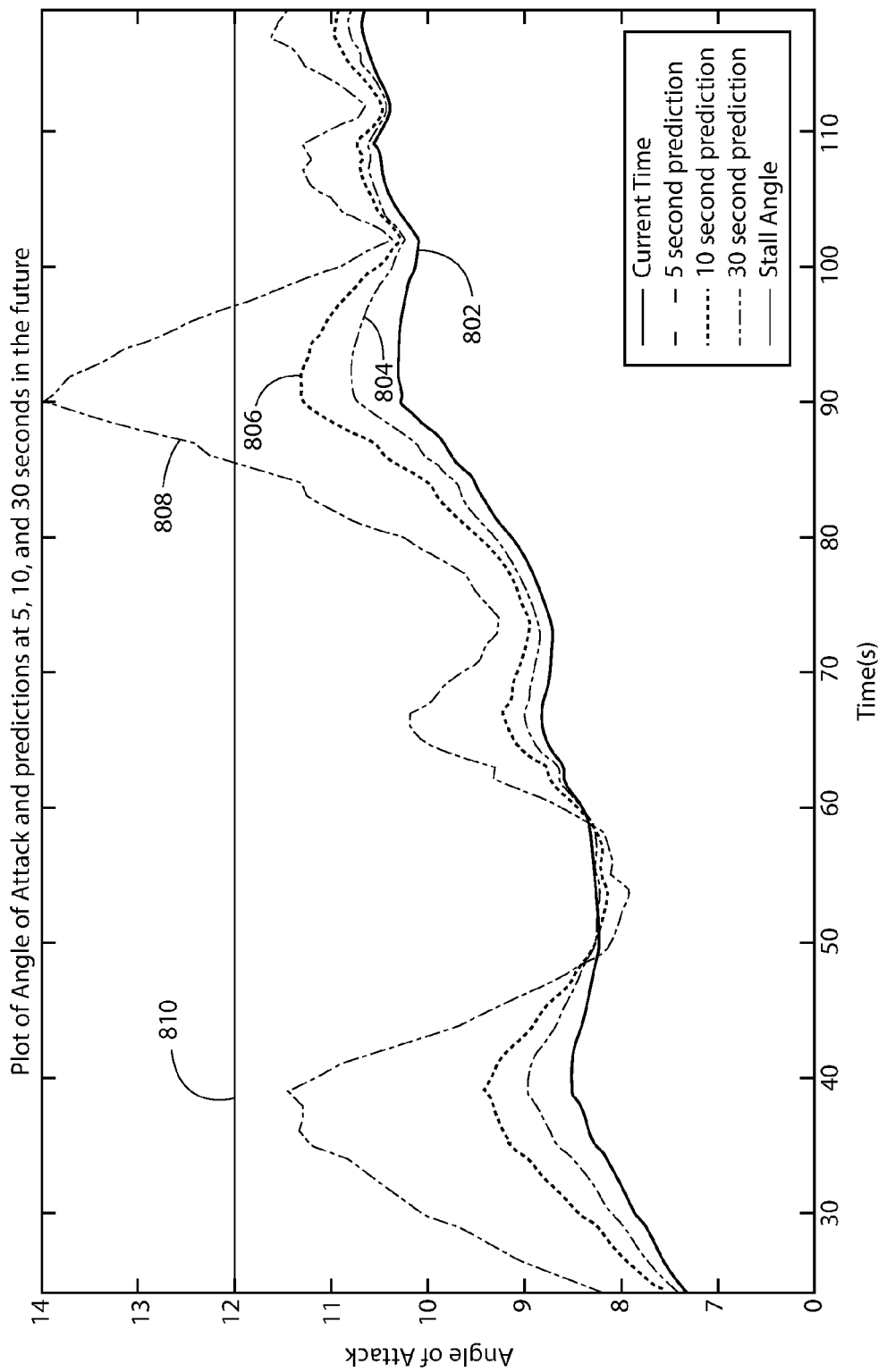
FIG. 8E is a graph that illustrates another example estimation, which can be determined by the predictive aircraft recovery control unit, of an example angle of attack parameter.

Referring in particular to FIG. 8A, the graph shows an example in which there is a linear increase in the value of the AoA. As shown, in such a case, the prediction has a high degree of accuracy. The example shown in FIG. 8B uses the same source data as the example shown in FIG. 8A, with random noise added to the AoA parameter. FIG. 8C shows an example in which the AoA increases linearly for some time, plateaus for a short duration, and resumes its linear increase. FIG. 8A-C are representative of control scenarios where the autopilot has been engaged in a manner that will eventually lead to a stall condition (e.g., autopilot is set to maintain altitude and the pilot slowly reduces engine thrust), and thus the aircraft recovery control unit 100 can predict this stall condition before it occurs. FIGS. 8D and 8E depict example control scenarios in which a pilot is controlling the aircraft in a manner that approaches the edge of the flight envelope. In the examples illustrated by FIGS. 8A-E, the state variable estimator implemented by the aircraft recovery control unit 100 can determine the inherent control states of the system at any given time, and calculate the future state of the system (e.g., angle of attack). The aircraft recovery control unit can calculate the future state of the system by starting with the current state, estimating the output value during the next time interval, and then iteratively using the results of the next time interval calculation until the desired future time, which in the illustrated example, is 5, 10, and 30 seconds in the future, is reached.

The aircraft recovery control unit 100 can trigger a recovery sequence when the state variable (in this case AoA) is determined to exceed a threshold (e.g., a critical angle of attack) at some time in the future. For example, in FIG. 8A, the 30 second prediction would trigger at around time=37, the 10 second prediction would trigger at around time=57, and the 5 second prediction would trigger at around time=62. As shown, the actual stall event would occur at around time=67. Thus, the based on the flight data, the aircraft recovery control unit 100 can determine a time period that will elapse before the aircraft enters the stall condition. As shown, the time period can be 1 to 30 seconds, for instance 3 to 10 seconds, though it will be understood that the time period can be greater than 30 seconds in some cases.

Figure 10A:
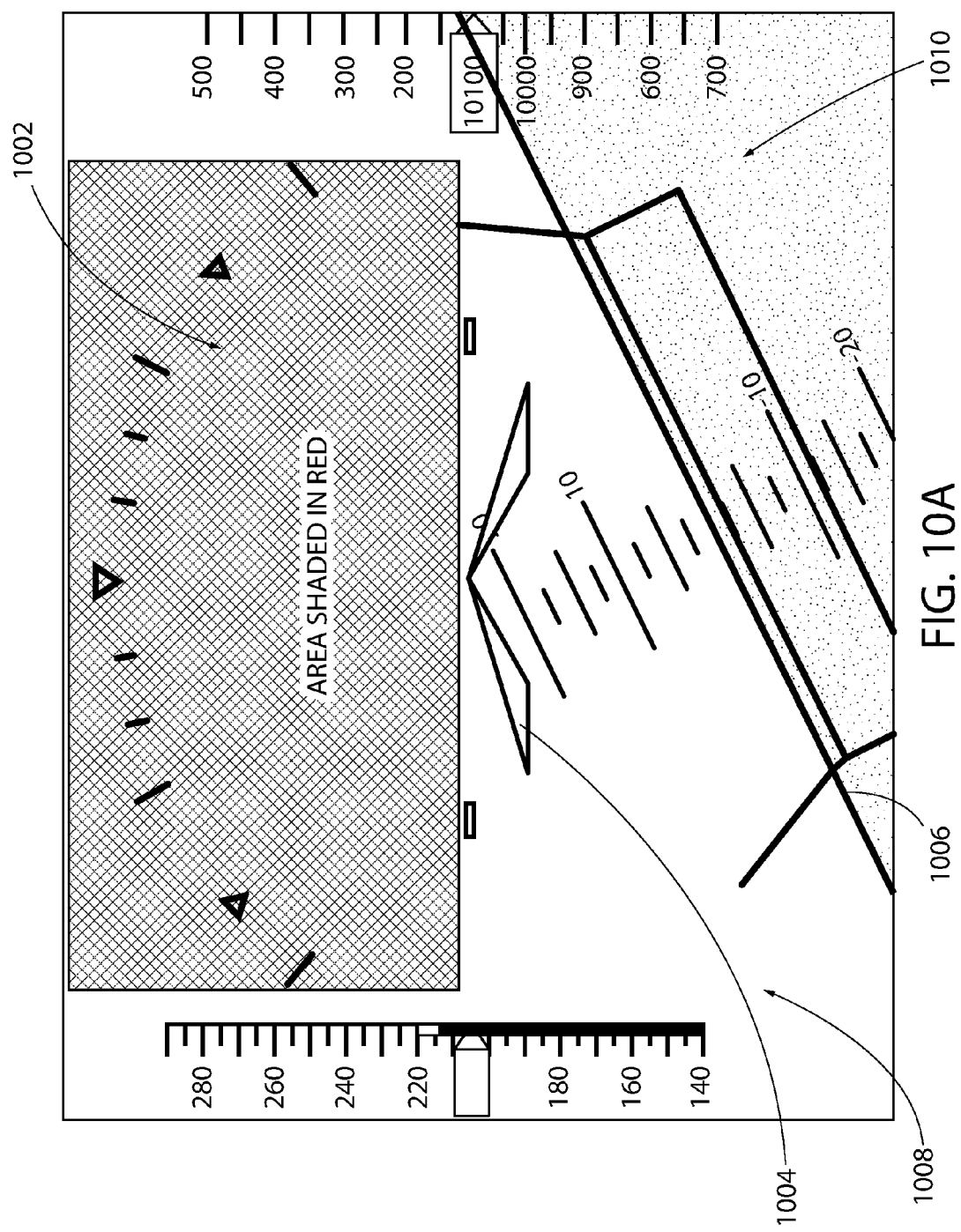
FIGS. 10A-D are example screenshots of a pilot guidance display that can be rendered for recovery by the predictive aircraft recovery control unit.

By way of further example, referring to FIG. 8D, the aircraft recovery control unit 100 would trigger the upset recovery sequence for the 30 second trigger at time=36 and time=63, the 10 second trigger would occur at time=67 and time=80, the 5 second trigger would occur at time=82, and the actual stall would occur at around time=84. As described further below, when the upset recover sequence is triggered, an recovery overlay (e.g., see. FIG. 10A) can be rendered on the flight displays 114a and 114b, and the pilot can be directed to take action that is needed to prevent the predicted upset. In accordance with the examples shown in FIGS. 8A-E, the aircraft recovery control unit 100 directs the pilot to reduce the angle of attack so as to avoid the stall condition.

Continuing with the stall example illustrated in FIGS. 8A-E, an aircraft wing can aerodynamically stall at the same angle of attack for a given FLAP (wing trailing edge device that alters the aerodynamic shape of the wing) configuration or SLAT (wing leading edge device that alters the aerodynamic shape of the wing) configuration. Thus, the predictive aircraft recovery control unit 100 can obtain data from the stall computers. The data can indicate a current angle of attack, which can be the angle of attack that corresponds to the current configuration of the wing. The critical angle of attack (CoA) can thus be referred to as a constant aerodynamic limitation that is specific to a lift producing device. By way of example, the flaps up configuration CoA for a given aircraft can be 12 degrees, the flaps level configuration for the given aircraft can be 8 degrees, and the flaps down configuration for the given aircraft can be 6 degrees. The airspeed at which the CoA is exceeded is a variable that can be based on wing loading (g-force), aircraft mass, and the location of actual center of gravity. When the predictive aircraft recovery control unit 100 analyze data from the AoA instrument, it can predict stalls within any set duration of time (e.g., see FIGS. 8A-E).

By way of another example of trend analysis, the predictive aircraft recovery unit 100 can apply the following formula to compute a trend.

$$\frac{(b)-(c)}{td} = ar(pt) + (b) = tav$$

In the above example, (b)=End Value, (c)=Start Value, td=Time Duration, pt=Predicted Time, ar=Acceleration Rate and tav=Trend Analysis Value. In an example, the predictive aircraft recovery control unit 100 can receive the following airspeed data periodically, for instance once every second, and the time duration can be specified at 5 seconds. The End Value and Start Value are taken at the 5 second mark and 1 second mark, respectively:

1 s=201 kts 2 s=200 kts 3 s=199 kts 4 s=198 kts 5 s=197 kts

Thus, the airspeed trend can then be determined using the formula above to determine the predicted airspeed in 3 seconds:

$$\frac{(197)-(201)}{5 \text{ s}} = -0.8(3 \text{ s}) + (197) = 194.6 kts$$

In an example, this trend analysis formula can be used for one or more, for instance each, in-flight parameter. It will be understood that the time duration and predicted time values can be changed as desired.

Thus, in accordance with the above example, the predictive aircraft recovery control unit 100 can determining a first airspeed at a first time and a second airspeed at a second time after the first time. The predictive aircraft recovery control unit 100 can compute a rate of decay of the airspeed of the aircraft based on the first airspeed and the second airspeed. Based on the rate of decay, the predictive aircraft recovery control unit 100 can determine a third airspeed of the aircraft when a time period elapses. For example, the third airspeed can be less than an airspeed required to avoid a stall condition when the time period elapses. For example, the time period can elapse 1 to 30 seconds, for instance 3 to 10 seconds, after the second time.

Referring again to FIG. 3, at 206, based on the trend analysis described above, the predictive aircraft recovery control unit 100 can predict the aircraft's flight condition. In some cases, based on the flight data, the predictive aircraft recovery control unit 100 can determine that the aircraft will enter a stall condition. Further, the predictive aircraft recovery control unit 100 can determine a time period that will elapse before the aircraft enters the stall condition. As shown, at 208, in response to determining that the aircraft will enter a stall condition after the time period elapses, the predictive aircraft recovery control unit 100 can trigger a recovery sequence before the aircraft enters the stall condition.

Figure 9:
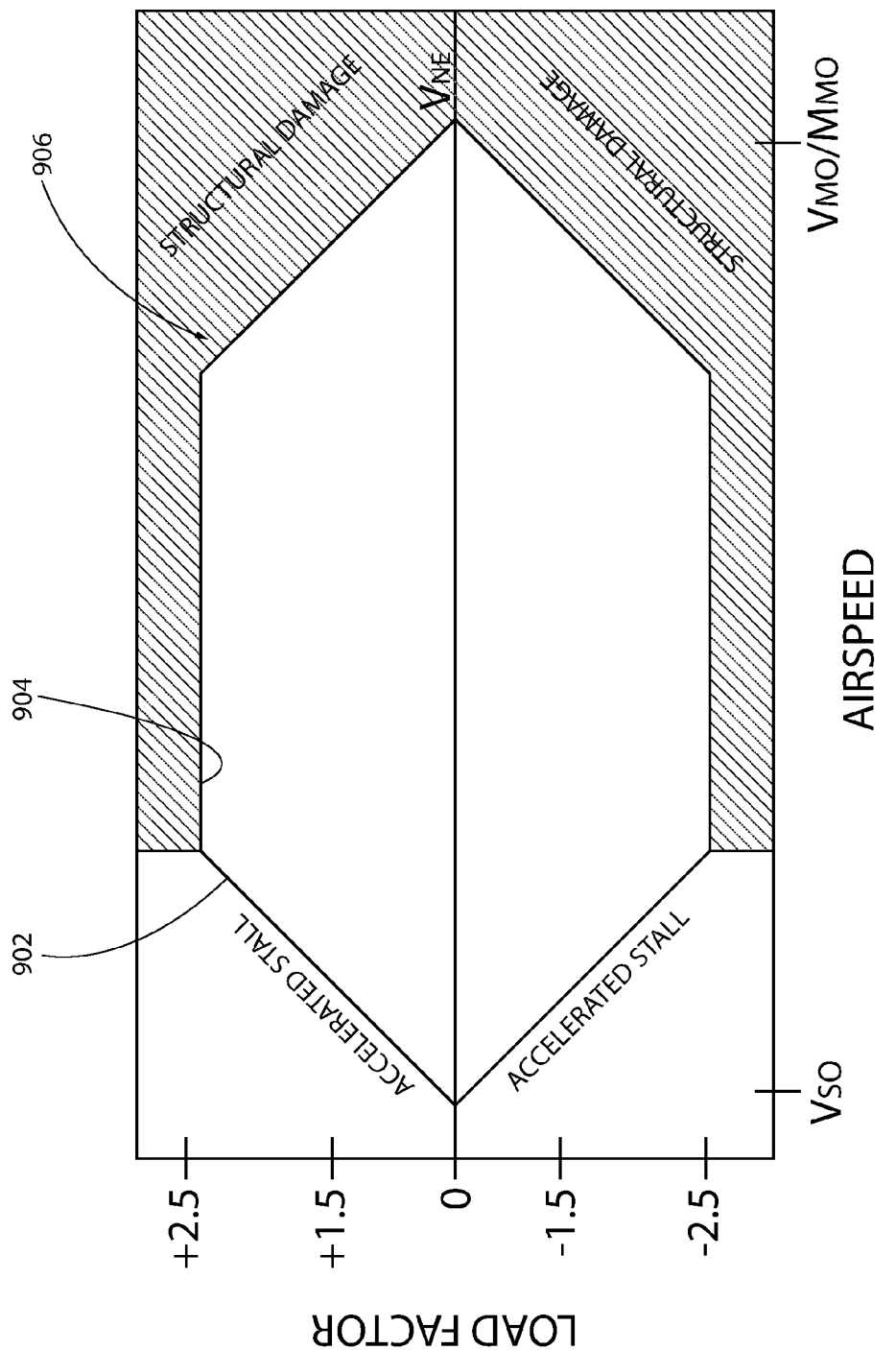
FIG. 9 is a diagram that depicts an example flight envelope and a recovery perimeter that is defined by the predictive aircraft recovery unit, wherein the recovery perimeter is within the flight envelope.

Referring now to FIG. 9, the predictive aircraft recovery control unit 100 can retrieve a flight envelope, for instance a flight envelope 902, associated with the aircraft. For instance, various flight envelopes that correspond to respective aircraft can be stored by the memory portion 104, or the flight envelopes can be otherwise retrieved using the input/output portion 108. The flight envelope 902 can define an operational boundary between a stable condition of the aircraft within the flight envelope and an unstable condition of the aircraft outside the flight envelope. As shown, an unstable condition outside of the flight envelope can include a condition 906 in which structural damage to the aircraft is possible or likely. In some cases, the flight envelope 902 is defined by a manufacturer of the aircraft, and the recovery sequence is triggered before the aircraft exits the flight envelope 902 so as to define a recovery perimeter 904 within the flight envelope 902 defined by the manufacturer. By way of example, the recovery sequence can be triggered from 1 to 30 seconds, for instance from 3 to 10 seconds, before the aircraft exits the flight envelope 902.

Figure 10B:
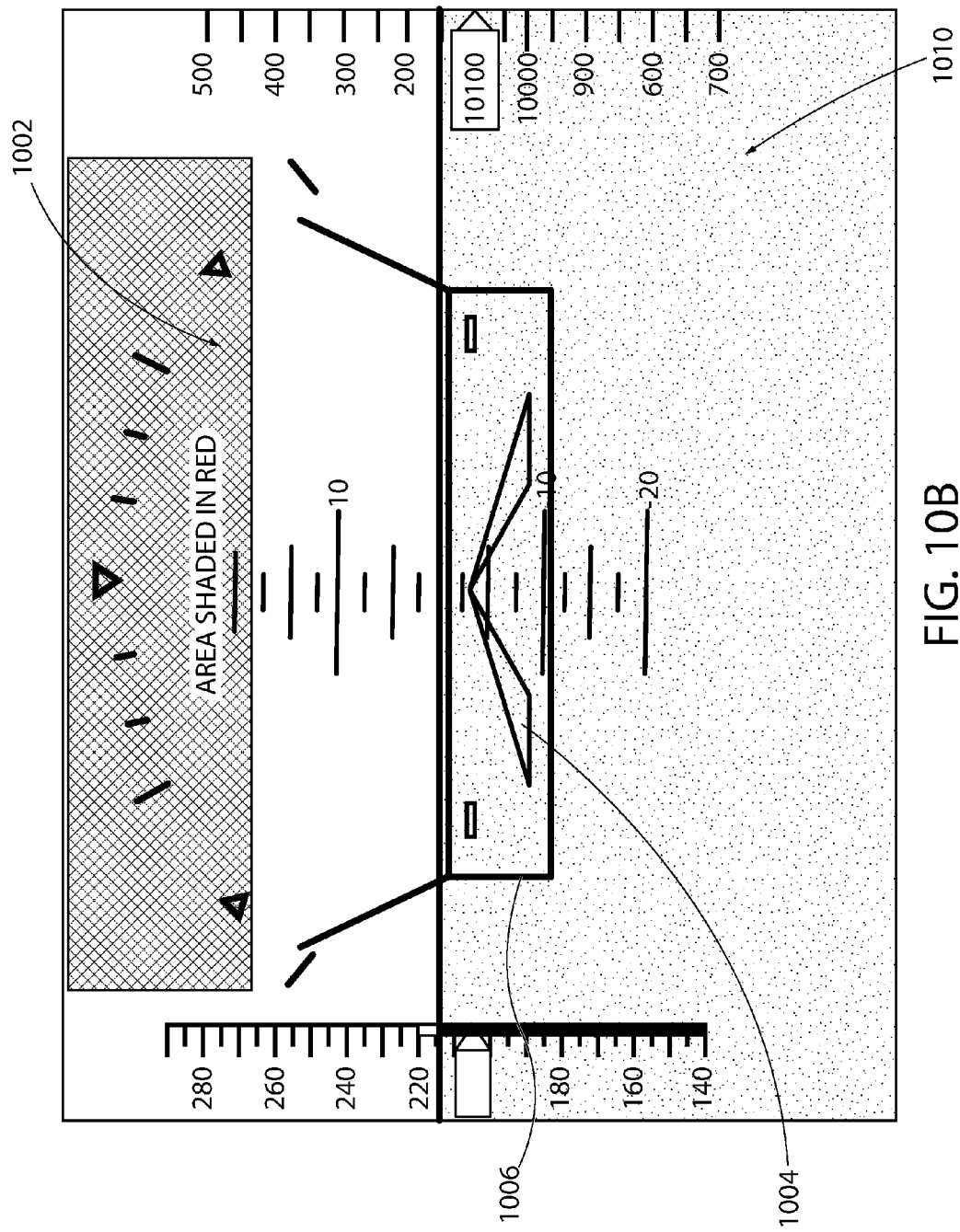
Figure 10C:
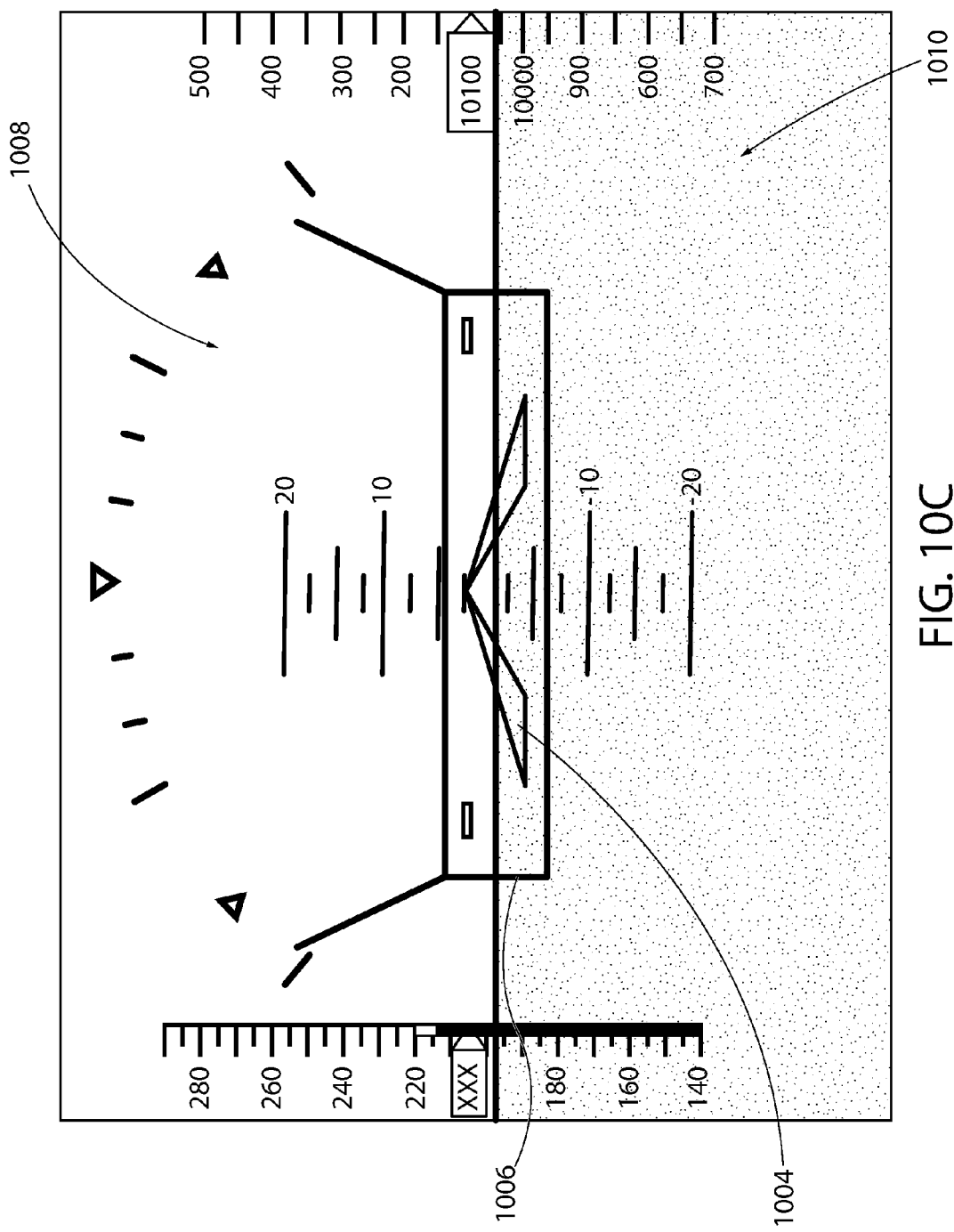

In some cases, as described above, a control column or yoke of the aircraft is configured to shake (which can be referred to as a stick shaker) based on an angle of attack of the aircraft, and the predictive aircraft recovery control unit 100 can trigger the recovery sequence from 1 to 60 seconds, for instance from 1 to 30 or 3 to 10 seconds, before the control column of the aircraft begins to shake. Without being bound by theory, the predictive aircraft recovery control unit 100 can trigger the recovery sequence before the control column begins to shake because the predictive aircraft control unit 100 can predict the angle of attack at some time in the future and compare the predicted angle of attack to a critical angle of attack, whereas the stick shaker is triggered by the current angle of attack as compared to the critical angle of attack. Triggering the recovery sequence can include rendering an audible alarm. Additionally, or alternatively, triggering the recovery sequence can include rendering a visual depiction representative of a corrective action, such that, when an auto flight system or a pilot of the aircraft complies with the corrective action, the operation of the aircraft is altered so as to avoid the stall condition. FIGS. 10A-C, which are described in detail below, illustrate various example visual depictions of corrective action. The predictive aircraft recovery control unit 100 can render visual depictions by sending the visual depictions to the primary flight displays 114a and 114b, so that the pilots can view the visual depictions of corrective action.

Referring particularly to FIGS. 10A-C, the visual depiction of the corrective action can include a box 1006 and an aircraft reference 1004, and the aircraft reference 1004 can be within the box 1006 (see FIGS. 10B and 10C) when the auto flight system or the pilot of the aircraft complies with the corrective action. It will be understood that the box 1006 and the aircraft reference 1004 can be alternatively shaped as desired. For example, FIG. 10A depicts an example display when the recovery sequence is triggered (at 208). As shown, an area 1002, which can be referred to as a danger area 1002, can be shaded one color, for instance red, to indicate danger. The box 1006 and the area 1002 can also be collectively referred to as a recovery overlay that is rendered by the aircraft recovery control unit 100. In one example, the area 1002 indicates a stall condition. Thus, the visual depiction illustrated in FIG. 10A can include the area 1002, which can be highlighted or otherwise identified so that the pilot knows to keep the aircraft reference 1004 away from the area 1002. The aircraft reference 1004 can correspond to the flight path of the aircraft, and thus can move on the displays 114a and 114b as the control column is manipulated by the pilots. The box 1006 can be a first color, and an area, for instance an area 1008 and 1010, outside the box can be a second color that is different than the first color, such that the pilot can comply with the corrective action with little thought, thereby mitigating the risk of an improper "flight or fight" response. For example, the first color can be green, and the second color can be red, though it will be understood that the box 1006 and the area outside the box (e.g., the area 1002) can be alternatively colored as desired. As shown, the area 1008 can represent the sky, and the area 1010 can represent the ground, and thus the colors in area 1008 and 1010 can differ from each other. In some cases, the color of area 1008 is blue and the color of area 1010 is brown. The area 1008 and the area 1010 can be separated from each other by an artificial horizon, which is known as an attitude indicator, as shown.

Figure 10D:
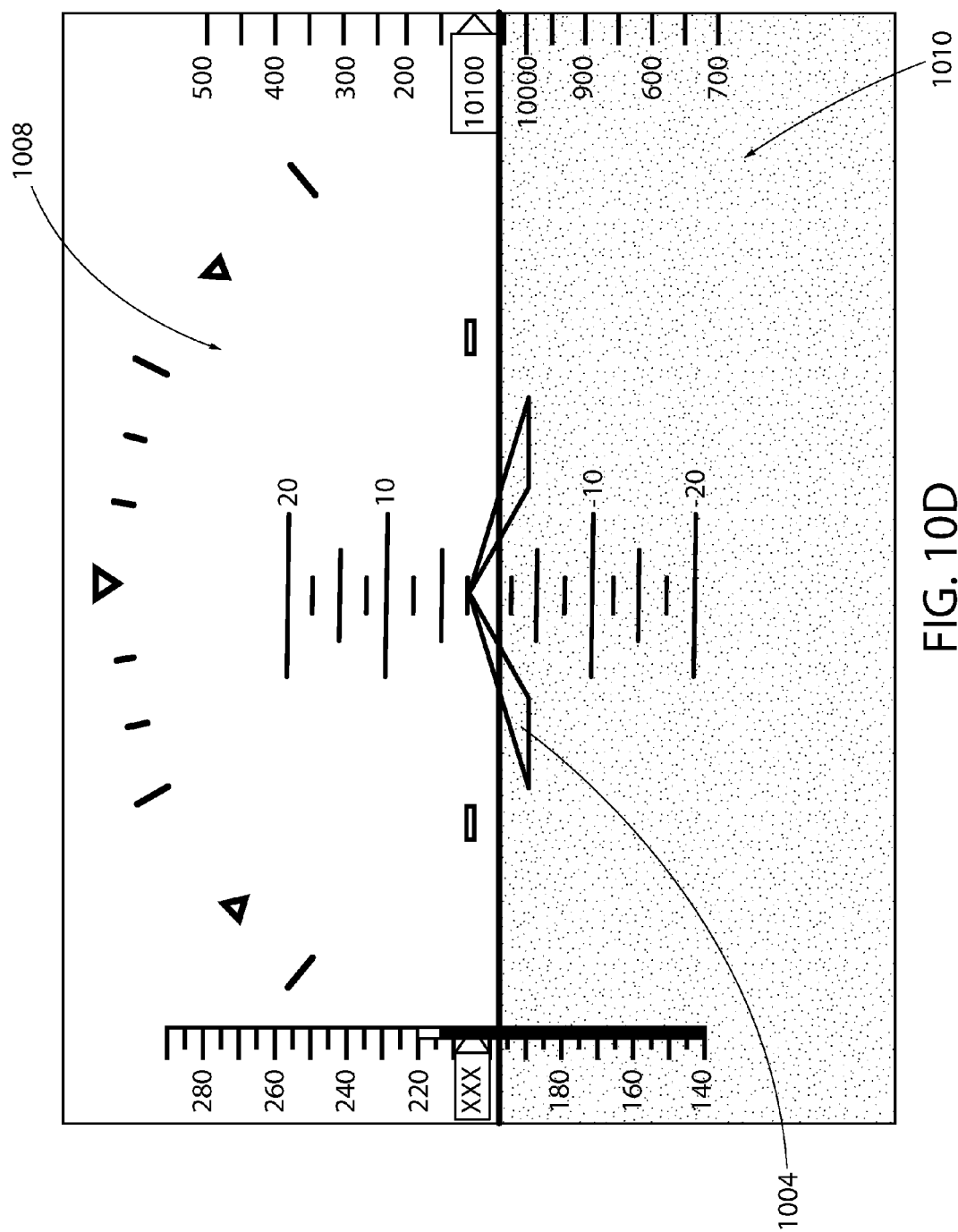

FIG. 10D shows an example of a standard digital cockpit display without the recovery overlay (e.g., box 1006 and area 1002). This can be shown before the recovery sequence is triggered or after the recovery sequence has been completed and the upset condition is avoided.

In some cases, the corrective action includes increasing the speed of the aircraft and decreasing pitch attitude of the aircraft so as to avoid the stall condition. Alternatively, or additionally, the visual depiction of correction action can include text indicating that thrust of the aircraft should be increased or decreased. Furthermore, the predictive aircraft recovery control unit 100 can trigger the recovery sequence by rendering one or more aural commands indicating that thrust of the aircraft should be increased or decreased.

It will be understood that the predictive aircraft recovery control unit 100 is not limited to triggering recovery sequences based on computing trends of one or more flight parameters, as described above. Based on the aircraft in which the aircraft recovery control unit 100 is deployed, the aircraft recovery control unit can be configured with absolute values. When these absolute values are met or exceed, the aircraft recovery control unit 100 can trigger a recovery sequence, as described herein. By way of example, the absolute values, which can also be referred to as predetermined tolerances or thresholds, can include a pitch attitude, an angle of attack (e.g., CoA), a bank angle, or rate of descent. For example, absolute values can include pitch attitude restrictions of +25 to −20 degrees, bank angle restrictions of +60 degrees, and rate of descent restrictions of 5000 feet per minute below 10,000 feet and 10,000 feet per minute above 10,000 feet. Absolute values can change, for instance to due to aircraft testing, as desired. The predictive aircraft recovery control unit 100 can use absolute values to restrict flight operations to operations that are considered to be normal. In the event of a rapid onset of upset, such as an upset related to wake turbulence for example, the aircraft recovery control unit 100 can determine that there is an upset by comparing in-flight parameters to the absolute values. For example, as flight data is received by the aircraft recovery control unit 100, it can be immediately compared against absolute values to determinate whether an immediate recovery sequence should be triggered. In an example, if absolute value is not exceed by aircraft data input (e.g., in flight parameters), the trend analysis computation (e.g., see FIGS. 8A-D) can then be passed back through the absolute values to determine if the predicted flight condition will exceed an absolute. This sequence can protect against accelerated stalls, a slow onset of a stall, and rapid or slow onsets of other upset conditions. If the aircraft recovery control unit 100 detects an imminent loss of control by determining that at least one of the absolute values will be exceeded, the aircraft recovery control unit can trigger a recovery sequence.

With respect to recovery sequences, the predictive aircraft recovery control unit 100 can determine an amount of change required, for instance to a particular parameter, to return the aircraft to level flight. In some cases, to render the corrective actions (e.g., the recovery overlay) on the primary flight displays, the aircraft recovery control unit uses various parameters, such as for example, the current aircraft position as it relates to pitch and roll, the current aircraft airspeed, a desired aircraft position as it relates to pitch and roll, and a desired aircraft airspeed. The current aircraft position can be received continuously from the AHRS and the current aircraft airspeed can be received continuously from the ADC. A desired aircraft position can be specific to the aircraft and can be retrieved, for example, from an onboard memory device of the aircraft recovery control unit 100. Similarly, the desired aircraft airspeed can be specific to the aircraft and can be retrieved from an onboard memory device of the aircraft recovery control unit 100.

In an example, when the recovery sequence is triggered, the current aircraft position and airspeed can be compared to the desired aircraft position and airspeed. The differences between the two positions can be calculated by the aircraft recovery control unit, such that the difference reflects where the aircraft should be positioned in order to satisfy the recovery sequence. By way of one example, without limitation:

$Y_p$=Current Pitch Value; $X_p$=Current Roll Value
$Y_d$=Desired Pitch Value; $X_d$=Desired Roll Value
$\Delta Y$=Required Change in Pitch; $\Delta X$=Required Change in Roll
Then:

$$Y_d - Y_p = \Delta Y \text{ and } X_d - X_p = \Delta X$$

Continuing with the above example, if the current pitch angle is +12 degrees and the current roll angle is +30 degrees (indicating a right turn), and the aircraft recovery control unit 100 retrieves a stored desired pitch of 2 degrees and a desired roll angle of 0 degrees, then the required change in values to recover the aircraft to the desired position is:

$$2-12=-10\Delta Y / 0-30=-30\Delta X$$

In an example in which an aircraft might not be equipped with full automation capability, the aircraft recovery control unit can render a depiction of the aircraft's desired position. Thus, the fly-to Box 1006 can be placed in a fixed position, such that, when the aircraft attitude reference 1004 is controlled inside the box 1006, the desired aircraft position is achieved within +/−2 $Y_d$ and +/−5 $X_d$. When the aircraft is controlled inside the fly-to box 1006 and accelerates to an airspeed corresponding to the desired airspeed, the recovery sequence can be deactivated by the aircraft recovery control unit 100, and considered to be complete.

In another example, the Fly-to box 1006 can be configured as a "Moving Target", similar to an existing flight director. For example, when the recovery sequence is triggered, the box 1006 can be placed immediately over the aircraft attitude reference, and then visually depicted moving to the desired aircraft position at a constant rate of change. This can be accomplished by implementing the aforementioned formula and applying a constant rate of change, for example $$\frac{\Delta Y}{\Delta t}.$$

In some cases, me rate or change is consistent with currently applied autoflight system logic, such that the rate of change maintains the aircraft within structural limitations (e.g., g-load) and autoflight control limitations. When the aircraft is maintained in the desired position +/−2 $Y_d$ and +/−5 $X_d$ and a desired airspeed is achieved, the recovery solution is complete.

In some cases, the amount of change is calculated such that the minimum loss of altitude and minimum G-load factor are imposed on the airframe during the recovery maneuver. When a recovery sequence is triggered during a slow onset of deteriorating flight conditions, the aircraft recovery control unit 100 can render the smoothest transition to level flight practicable while immediately removing the aircraft from the dangerous condition for which it was heading. During events of rapid upset, such as wake turbulence for example, the aircraft recovery control unit 100 can calculate the smoothest return practicable to level flight with minimal g-load factor and altitude loss. The corrective actions to achieve desired set values for level flight and the resolution can be converted to guidance on the primary flight displays 114a and 114b, as shown in FIGS. 10A-D. Referring again to FIG. 10A, an example of an aircraft in a climbing right turn is depicted. In this example, aircraft recovery control unit 100 determines that the aircraft will enter a stall within 3 seconds of continued operation in the current state. Thus, the aircraft recovery control unit 100 triggers the recovery sequence. For example, an aural warning tone can sound in the cockpit. Further, aircraft recovery control unit 100 can provide instantaneous flight display guidance in the form of the box 1006, which can be referred to as a fly-to command box. Further still, the display can indicate, via color shading for example, that the area 1002 is the region of flight that triggered the recovery sequence.

Continuing with the example, FIG. 10B depicts the immediate corrective action that is applied by the pilot. As shown, the aircraft reference 1004 is within the fly-to box 1006. As the aircraft is flown down into the fly-to box 1006, the aircraft recovery control unit 100 can provide continuous resolution output to return to level flight. FIG. 10C shows that the aircraft is guided to a return to level flight and the danger area 1002 is removed. As shown in FIG. 10D, the aircraft has safely returned to level, and thus the triggered recovery is complete.

Referring again to FIGS. 2 and 3, when the recovery sequence is triggered at 208, the predictive aircraft recovery control unit 100 can send the visual depiction of corrective action, via the central avionics processor 112, to the primary flight displays 114a and 114b. The predictive aircraft recovery control unit 100 can also send an output signal to the aircraft aural warning system to provide an aural warning tone consistent with alerting the pilot to a potentially dangerous situation. The warning tone can also indicate that the recovery sequence has been triggered.

In an example, the aircraft recovery control unit 100 can be overridden or disabled, for instance by the pilot. In some cases, the pilot can override or disable the aircraft recovery control unit 100 without complication. For example, the aircraft recovery control unit 100 can be coupled to a pilot interface cockpit toggle switch. The switch can provide at least two selections, for instance "ARM" and "OFF". In an example, when the switch is in the ARM position, the aircraft recovery control unit 100 is armed and provides upset and loss of control protection when the aircraft is airborne at a certain height (e.g., 500 feet). By way of example, a given aircraft can be determined to be airborne by the weight on wheels switch being in the airborne position. The aircraft recovery control unit 100 can also contain a cockpit circuit breaker.

To quickly disable the aircraft recovery control unit 100, the pilot can place the associated cockpit toggle switch to the OFF position. In some cases, the aircraft recovery control unit 100 can be disabled when the EGPWS provides winds hear alerts or terrain avoidance alerts such as "Pull Up, Pull Up".

The aircraft recovery control unit 100 can operate during multiple modes of operation of the aircraft. For example, aircraft recovery control unit 100 can operate during takeoff, normal operation, and landing. The modes can be determined by aircraft configuration and radar altimetry, if active. By way of example, when a given aircraft is above 500 feet GAL and climbing, with landing gear retracted, the aircraft recovery control unit 100 can operate in the take-off mode. In the takeoff mode, if a recovery sequence is triggered, the aircraft recovery control unit 100 can provide a recovery maneuver that does not cause altitude loss. For instance, the aircraft recovery control unit 100 can reduce the angle of attack or angle of incidence such that the aircraft continues to climb, while still achieving a safe reduction in angle of attack to prevent a stall encounter. By way of another example, the aircraft recovery control unit 100 can provide resolution to a return bank angle, when an upset due to wake turbulence is encountered while in the take-off mode and the aircraft rolls beyond the absolute values, to within safe limits while maintaining a pitch angle that provides minimal g-load factor and altitude loss. In an example, when the radar altimeter indicates 2,000 feet height above ground or greater, the aircraft recovery control unit 100 is in the normal mode and normal recovery resolutions are provided. It will be understood that the various modes can be configured as desired, and can depend on the aircraft in which a particular aircraft recovery control unit is configured to operate.

With respect to landing mode, in one example, a given aircraft can be considered to be in landing mode when it enters 2,500 feet above ground level (e.g., as indicated by the radar altimetry) and any flap position is selected greater than zero. In the event of a flap failure, the flap handle can be selected to a position greater than zero to indicate landing intention. While in the landing mode, the recovery sequence of the aircraft recovery control unit can be altered so as to provide immediate corrective actions to regain aircraft positive control and the aircraft recovery control unit can execute a go-around sequence. The go-around sequence can send commands to the Flight Guidance Computer, such that the aircraft's go-around flight director mode is activated.

In some cases, the aircraft recovery control unit 100 can inhibit itself. For example, when the aircraft achieves a height above ground while on approach that is below a threshold for recovery, the aircraft recovery control unit 100 can be inhibited from providing any recovery guidance or maneuver. This is due to the fact that recovery from an upset or stalled condition with close proximity to the ground might not be possible, and therefore the aircraft recovery control unit 100 can be inhibited in those cases. The inhibit altitude can vary as desired, and can vary as desired, and can vary in accordance with various aircrafts. In another example, when the aircraft weight on wheels switch detects that the aircraft is on ground, the aircraft recovery control unit 100 is inhibited.

The aircraft recovery control unit 100 can provide crew alerting messages and/or cockpit annunciations to indicate system status during operations on ground and in flight. The aircraft recovery control unit 100 can include a built in test (BIT) function that, upon initial power up for example, can runs a diagnosis and software check. If any faults or failures are detected, the aircraft recovery control unit 100 can display the appropriate cockpit annunciations or crew alerting messages.

It will be understood that any of the methods and processes described herein may be embodied in the form of computer executable instructions (i.e., program code) stored on a computer-readable storage medium which instructions, when executed by a machine, such as a computer, server, aircraft recovery control unit, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An aircraft recovery control unit, the aircraft recovery control unit comprising:
    a processor and communication circuitry, wherein the processor is configured to connect via the communication circuitry to a flight display and a plurality of data instruments that obtain respective in-flight parameters associated with an aircraft, and the processor is further configured to:
        receive flight data from the plurality of data instruments, the flight data indicative of at least a speed of the aircraft and a position of the aircraft, the position defining a pitch and roll of the aircraft;
        retrieve a flight envelope associated with the aircraft, the flight envelope defining an operational boundary between a stable condition of the aircraft within the flight envelope and an unstable condition of the aircraft outside the flight envelope;
        based on the flight data, determine that the aircraft will enter an unstable condition;
        in response to determining that the aircraft will enter the unstable condition, trigger a recovery sequence before the aircraft enters the unstable condition and before the aircraft exits a recovery perimeter within the flight envelope that is defined by a manufacturer of the aircraft, so as to place the aircraft in a recovery state; and
        during the recovery state, cause an aircraft reference representative of a current flight condition, and an overlay of a moving target immediately over the aircraft reference, to be displayed on the flight display, the overlay defining 1) an area indicative of the unstable condition and 2) the moving target separated from the area, the moving target representative of the aircraft returning to a level flight condition from the current flight condition at a constant rate of change,
        wherein the moving target and the aircraft reference are continuously updated responsive to the speed of the aircraft, the pitch of the aircraft, and the roll of the aircraft, and the aircraft transitions out of the recovery state when a pilot controls the speed of aircraft, the pitch of the aircraft, and the roll of the aircraft, so as to place the aircraft reference within the moving target.

2. The aircraft recovery control unit of claim 1, wherein the moving target includes a box, and the aircraft reference is within the box when aircraft returns to the level flight condition.

3. The aircraft recovery control unit of claim 2, wherein the box is a first color, and an area outside the box is a second color that is different than the first color.

4. The aircraft recovery control unit of claim 1, wherein, during the recovery state, the processor is further configured to display text indicating that thrust of the aircraft should be increased or decreased.

5. The aircraft recovery control unit of claim 1, wherein the processor is further configured to, when the recovery sequence is triggered, render one or more aural commands indicating that thrust of the aircraft should be increased or decreased.

6. The aircraft recovery control unit of claim 1, wherein the processor is further configured to be operable in a plurality of aircrafts, each aircraft associated with a respective flight envelope.

7. An aircraft comprising:
    a plurality of data instruments that obtain respective in-flight parameters associated with the aircraft
    a flight display configured to display flight guidance to a pilot of the aircraft; and
    an aircraft control unit communicatively connected to the flight display and the plurality of data instruments, the aircraft control unit configured to:
        receive flight data from the plurality of data instruments, the flight data indicative of at least a speed of the aircraft and a position of the aircraft, the position defining a pitch and roll of the aircraft;
        retrieve a flight envelope associated with the aircraft, the flight envelope defining an operational boundary between a stable condition of the aircraft within the flight envelope and an unstable condition of the aircraft outside the flight envelope;

based on the flight data, determine that the aircraft will enter an unstable condition;

in response to determining that the aircraft will enter the unstable condition, trigger a recovery sequence before the aircraft enters the unstable condition and before the aircraft exits a recovery perimeter within the flight envelope that is defined by a manufacturer of the aircraft, so as to place the aircraft in a recovery state; and during the recovery state cause an aircraft reference representative of a current flight condition, and an overlay of a moving target immediately over the aircraft reference, to be displayed on the flight display, the overlay defining 1) an area indicative of the unstable condition and 2) the moving target separated from the area, the moving target representative of the aircraft returning to a level flight condition from the current flight condition at a constant rate of change, wherein the moving target and the aircraft reference are continuously updated responsive to the speed of the aircraft, the pitch of the aircraft, and the roll of the aircraft, and the aircraft transitions out of the recovery state when the pilot controls the speed of aircraft, the pitch of the aircraft, and the roll of the aircraft, so as to place the aircraft reference within the moving target.

8. The aircraft of claim 7, wherein the plurality of data instruments comprise an attitude system and an air data computer.

9. The aircraft of claim 7, wherein the flight data comprises the respective in-flight parameters that are indicative of at least one of an altitude of the aircraft, an airspeed of the aircraft, a vertical speed of the aircraft, an angle of attack of the aircraft, a thrust lever angle of the aircraft, an engine speed of the aircraft, a bank angle of the aircraft, a critical angle of attack of the aircraft, a flap position of the aircraft, and a landing gear position of the aircraft.

10. A method performed by an aircraft, wherein the aircraft comprises a processor, a flight display, and a plurality of data instruments that obtain respective in-flight parameters associated with the aircraft, the method comprising:

obtaining, by ones of the plurality of data instruments, flight data indicative of at least a speed of the aircraft and a position of the aircraft, the position defining a pitch and roll of the aircraft;

storing a flight envelope associated with the aircraft, the flight envelope defining an operational boundary between a stable condition of the aircraft within the flight envelope and an unstable condition of the aircraft outside the flight envelope;

based on the flight data and the flight envelope, determining, by the processor, that the aircraft will enter an unstable condition;

in response to determining that the aircraft will enter the unstable condition, triggering, by the processor, a recovery sequence before the aircraft enters the unstable condition and before the aircraft exits a recovery perimeter within the flight envelope that is defined by a manufacturer of the aircraft, so as to place the aircraft in a recovery state; and during the recovery state, causing an aircraft reference representative of a current flight condition, and an overlay of a moving target immediately over the aircraft reference, to be displayed on the flight display, the overlay defining 1) an area indicative of the unstable condition and 2) the moving target separated from the area, the moving target representative of the aircraft returning to a level flight condition from the current flight condition at a constant rate of change, wherein the moving target and the aircraft reference are continuously updated responsive to the speed of the aircraft, the pitch of the aircraft, and the roll of the aircraft, and the aircraft transitions out of the recovery state when a pilot controls the speed of aircraft, the pitch of the aircraft, and the roll of the aircraft, so as to place the aircraft reference within the moving target.

11. The method of claim 10, wherein the moving target includes a box, and the aircraft reference is within the box when the aircraft returns to the level flight condition.

12. The method of claim 11, wherein the box is a first color, and an area outside the box is a second color that is different than the first color.

13. The method of claim 10, the method further comprising: during the recovery state, displaying text indicating that thrust of the aircraft should be increased or decreased.

14. The method of claim 10, wherein triggering the recovery sequence comprises rendering one or more aural commands indicating that thrust of the aircraft should be increased or decreased.

15. The method of claim 10, wherein triggering the recovery comprises changing an operation of the aircraft at a constant rate until the aircraft operates within the recovery perimeter.

16. The method of claim 10, wherein triggering the recovery comprises rendering an audible alarm.

17. The method of claim 10, wherein the plurality of data instruments comprise an attitude system and an air data computer.

* * * * *